(12) United States Patent
Kim et al.

(10) Patent No.: US 11,560,661 B2
(45) Date of Patent: Jan. 24, 2023

(54) WASHING MACHINE AND CONTROL METHOD THEREOF

(71) Applicant: SAMSUNG ELECTRONICS CO., LTD., Suwon-si (KR)

(72) Inventors: Bobin Kim, Suwon-si (KR); Haeyoon Park, Suwon-si (KR); Hansaem Kim, Suwon-si (KR); Joonho Lee, Suwon-si (KR); Kyoungae Lim, Suwon-si (KR); Dongmin Lee, Suwon-si (KR); Hyeokjin Choi, Suwon-si (KR); Romon Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/314,273

(22) Filed: May 7, 2021

(65) Prior Publication Data
US 2021/0262140 A1 Aug. 26, 2021

Related U.S. Application Data

(63) Continuation of application No. 17/105,016, filed on Nov. 25, 2020.

(30) Foreign Application Priority Data

Nov. 29, 2019 (KR) .................. 10-2019-0157408
Feb. 28, 2020 (KR) .................. 10-2020-0025475

(51) Int. Cl.
*D06F 34/30* (2020.01)
*D06F 34/08* (2020.01)
(Continued)

(52) U.S. Cl.
CPC ............ *D06F 34/30* (2020.02); *D06F 29/005* (2013.01); *D06F 34/04* (2020.02); *D06F 34/05* (2020.02);
(Continued)

(58) Field of Classification Search
CPC ........ D06F 29/005; D06F 39/08; D06F 39/28; D06F 34/04; D06F 34/05
See application file for complete search history.

(56) References Cited

U.S. PATENT DOCUMENTS

2001/0025392 A1* 10/2001 Youn ................ D06F 34/05
8/159
2003/0115682 A1 6/2003 Gardner
(Continued)

FOREIGN PATENT DOCUMENTS

EP 3 348 698 A1 7/2018
JP 5-15687 1/1993
(Continued)

OTHER PUBLICATIONS

KR20140005484A Machine Translation (Year: 2014).*
(Continued)

*Primary Examiner* — Spencer E. Bell
(74) *Attorney, Agent, or Firm* — Staas & Halsey LLP

(57) ABSTRACT

Disclosed herein is a washing machine and a control method thereof, and more particularly, to a technology capable of controlling washing modes in various manners by manipulating a control panel of the washing machine. The washing machine includes a display configured to display a washing mode, an inputter configured to receive a washing mode select command, a storage configured to store a selected washing mode, and a controller configured to allow a washing mode, which has the largest number of times selected during a predetermined number of times of washings, to be displayed on a first screen of the display, and in response to the number of the washing mode having the largest number of selection times being plural, configured to
(Continued)

allow a washing mode, which is the last selected among the plurality of washing modes, to be displayed on the first screen of the display.

16 Claims, 29 Drawing Sheets

(51) Int. Cl.
| | |
|---|---|
| *D06F 58/36* | (2020.01) |
| *D06F 58/46* | (2020.01) |
| *D06F 34/04* | (2020.01) |
| *D06F 29/00* | (2006.01) |
| *G05B 19/042* | (2006.01) |
| *D06F 34/05* | (2020.01) |
| *D06F 34/28* | (2020.01) |
| *D06F 101/20* | (2020.01) |
| *D06F 105/58* | (2020.01) |
| *D06F 105/62* | (2020.01) |
| *D06F 105/56* | (2020.01) |
| *D06F 105/10* | (2020.01) |
| *D06F 101/12* | (2020.01) |
| *D06F 31/00* | (2006.01) |

(52) U.S. Cl.
CPC .............. *D06F 34/08* (2020.02); *D06F 34/28* (2020.02); *D06F 58/36* (2020.02); *D06F 58/46* (2020.02); *G05B 19/0426* (2013.01); *D06F 31/00* (2013.01); *D06F 2101/12* (2020.02); *D06F 2101/20* (2020.02); *D06F 2105/10* (2020.02); *D06F 2105/56* (2020.02); *D06F 2105/58* (2020.02); *D06F 2105/62* (2020.02); *G05B 2219/2633* (2013.01)

(56) References Cited

U.S. PATENT DOCUMENTS

| | | | | |
|---|---|---|---|---|
| 2006/0190266 | A1* | 8/2006 | Tanigawa | D06F 93/00 |
| | | | | 704/273 |
| 2007/0119072 | A1* | 5/2007 | Kim | D06F 29/00 |
| | | | | 34/596 |
| 2007/0241938 | A1* | 10/2007 | Ulius-Sabel | D06F 34/32 |
| | | | | 341/22 |
| 2010/0275386 | A1 | 11/2010 | Ko et al. | |
| 2013/0185079 | A1* | 7/2013 | Park | D06F 34/05 |
| | | | | 704/275 |
| 2013/0271259 | A1* | 10/2013 | Brasseur | D06F 39/12 |
| | | | | 340/4.31 |
| 2018/0237976 | A1* | 8/2018 | Li | D06F 58/30 |
| 2018/0291545 | A1 | 10/2018 | Jones | |

FOREIGN PATENT DOCUMENTS

| | | |
|---|---|---|
| KR | 1997-0043477 | 7/1997 |
| KR | 10-2004-0045755 | 6/2004 |
| KR | 10-2006-0085786 | 7/2006 |
| KR | 10-0674718 | 1/2007 |
| KR | 10-2007-0067976 | 6/2007 |
| KR | 10-0739617 | 7/2007 |
| KR | 10-0739618 | 7/2007 |
| KR | 10-2008-0069436 | 7/2008 |
| KR | 10-2010-0119451 | 11/2010 |
| KR | 10-1083515 | 11/2011 |
| KR | 20140005484 A * | 1/2014 |
| KR | 10-1381144 | 4/2014 |
| KR | 10-2014-0103763 | 8/2014 |
| KR | 10-1479243 | 1/2015 |
| KR | 10-2015-0028006 | 3/2015 |
| KR | 10-2015-0050857 | 5/2015 |
| KR | 10-2016-0092453 A | 8/2016 |
| KR | 10-2017-0049611 | 5/2017 |
| WO | 2016/045180 | 3/2016 |

OTHER PUBLICATIONS

Korean Office Action dated Apr. 8, 2020 from Korean Application No. 10-2020-0025475, 8 pages.
Korean Office Action dated Aug. 26, 2020 from Korean Application No. 10-2020-0025475, 9 pages.
Korean Office Action dated Dec. 28, 2020 from Korean Application No. 10-2020-0025475.
U.S. Appl. No. 17/105,016, filed Nov. 25, 2020, Bobin Kim et al., Samsung Electronics Co., Ltd.
International Search Report dated Mar. 31, 2021, in corresponding International Patent Application No. PCT/KR2020/016833.
Written Opinion of the International Searching Authority dated Mar. 31, 2021, in corresponding International Patent Application No. PCT/KR2020/016833.
Korean Office Action dated Feb. 25, 2021, in corresponding Korean Patent Application No. 10-2020-0025475.
Korean Office Action dated Apr. 30, 2021, in corresponding Korean Patent Application No. 10-2020-0045066.
Office Action dated Jun. 10, 2022, in Korean Application No. 10-2021-0089099.
European Search Report dated Oct. 27, 2022, issued in European Application No. EP 20 89 3950.

* cited by examiner

WASHING MACHINE AND CONTROL METHOD THEREOF

CROSS-REFERENCE TO RELATED APPLICATION(S)

This application is a continuation of U.S. application Ser. No. 17/105,016, filed Nov. 25, 2020, and is based on and claims priority under 35 U.S.C. § 119 to Korean Patent Application No. 10-2019-0157408, filed on Nov. 29, 2019, and No. 10-2020-0025475, filed on Feb. 28, 2020 in the Korean Intellectual Property Office, the disclosure of which is incorporated by reference herein in their entireties

BACKGROUND

1. Field

The disclosure relates to a washing machine and a control method thereof, and more particularly, to a technology capable of controlling washing modes in various manners by manipulating a control panel of the washing machine.

2. Description of Related Art

In general, a washing machine is a device for washing laundry by rotating a cylindrical rotating tub containing laundry. The type of washing machine includes a washing machine, in which a drum is placed horizontally and thus when the drum rotates about the horizontal axis, the laundry is raised and dropped along an inner circumferential surface of the drum, thereby washing laundry, and a washing machine, in which a drum having a pulsator is placed vertically and thus when the drum rotates about the vertical axis, the laundry is washed by water current generated by the pulsator.

Recently used washing machines may perform washing on various types of laundry in various washing modes. A user can control an operation of the washing machine by manipulating a control panel provided in the washing machine, and a user can control the washing machine to perform washing by setting a desired washing course and washing option.

Meanwhile, in order to conveniently edit and control various washing modes of a washing machine so as to increase user convenience, various studies related to a control method of washing modes through a control panel have been conducted. Particularly, there is a growing need of a technology that learns a washing course and a washing option, which are frequently used by a user, and automatically provides the washing course and the washing option to the user on a display and thus the technology allows the user to intuitively edit and select the washing course and the washing option by manipulating an inputter. In addition, a research on a technology for controlling an operation of other devices such as dryers through manipulation of the control panel of the washing machine has been conducted.

SUMMARY

Therefore, it is an aspect of the disclosure to provide a washing machine capable of allowing a user to control a washing mode in various manners by manipulating a control panel of the washing machine, and capable of automatically providing information on a washing mode, which is frequently used by a user, to the user.

Additional aspects of the disclosure will be set forth in part in the description which follows and, in part, will be obvious from the description, or may be learned by practice of the disclosure.

In accordance with an aspect of the disclosure, a washing machine includes a display configured to display a washing mode, an inputter configured to receive the washing mode select command, a storage configured to store the selected washing mode, and a controller configured to allow a washing mode, which has the largest number of times selected during a predetermined number of times of washings, to be displayed on a first screen of the display, and in response to the number of the washing mode having the largest number of selection times being plural, configured to allow a washing mode, which is the last selected among the plurality of washing modes, to be displayed on the first screen of the display.

The inputter may receive a washing option change command for the selected washing mode, and the controller may store the washing option change command in the storage in response to receiving the washing option change command for the selected washing mode by a predetermined number of times, and the controller may allow the washing mode with the changed washing option to be performed in response to the washing mode being selected again.

In response to powering on of the washing machine, the display may display the washing mode, which has the largest number of times selected during the predetermined number of times of washings, to be displayed on the first screen, and in response to the number of the washing mode having the largest number of selection times being plural, the display may display the washing mode, which is the last selected among the plurality of washing modes, to be displayed on the first screen.

The display may display a washing option for the selected washing mode, and in response to receiving the washing option change command for the selected washing mode by the predetermined number of times, the display may display the changed washing option upon selecting the washing mode.

The inputter may be implemented in a form of a jog dial, and the inputter may receive the washing mode search command according to a clockwise rotation or a counter-clockwise rotation of the jog dial, and the display may display the washing mode in a predetermined order according to the washing mode search command.

In accordance with another aspect of the disclosure, a washing machine includes a display configured to display a plurality of washing modes, an inputter configured to receive the plurality of washing mode edit commands, a storage configured to store a washing mode selected according to the washing mode edit command, and a controller configured to allow the washing mode selected among the plurality of washing modes to be displayed on the display, and configured to allow a washing mode, which is other than the selected washing mode, not to be displayed on the display.

The inputter may receive at least one washing mode select command from a user among the plurality of washing modes, and the display may display the at least one washing mode selected according to the received washing mode select command.

The inputter may receive at least one washing mode deselect command from a user among the plurality of washing modes, and the display may not display the at least one washing mode deselected according to the received washing mode deselect command.

In response to the number of the washing mode, which is selected according to the washing mode select command, being plural, the display may display the washing mode in order of selection.

The inputter may include a jog dial form, and the inputter may receive the plurality of washing mode search commands according to a clockwise rotation or a counterclockwise rotation of the jog dial, and the inputter may receive at least one washing mode select command or washing mode deselect command during searching the plurality of washing modes.

In accordance with another aspect of the disclosure, a washing machine includes a display configured to display a washing mode, a storage configured to store the washing mode list, an inputter configured to receive the washing mode search command, and a controller configured to allow the stored washing mode list to be displayed in a predetermined order on the display in response to receiving a search command performed by rotating the inputter in a clockwise direction and configured to allow a previous washing mode of a washing mode, which is currently being displayed on the display in the washing mode list, to be displayed in response to receiving a search command performed by rotating the inputter in a counterclockwise direction.

The controller may preferentially determine a display order of the washing mode list in the washing mode list in proportion to the number of times selected by a user through the inputter, and the display may display the washing mode based on the determined display order of the washing mode list in response to the power on of the washing machine.

The washing machine may further include a communication circuitry configured to download a new washing mode from a server, and the controller may allow the downloaded new washing mode to be displayed at the end of the washing mode list displayed on the display.

In response to the number of the downloaded new washing mode being plural, the controller may allow the plurality of downloaded new washing mode lists to be displayed at the end of the washing mode list displayed, which is displayed on the display, in order of download.

In response to receiving a search command performed by rotating the inputter in a counterclockwise direction, the controller may allow the plurality of downloaded new washing modes to be displayed on the display in reverse order of download that is the last downloaded new washing mode is displayed first.

The inputter may receive a user-set washing mode, and the storage may store the received user-set washing mode.

The controller may allow the received user-set washing mode to be displayed prior to the washing mode list displayed on the display, and the display may display the received user-set washing mode in response to the power-on of the washing machine.

In response to the number of the received user-set washing mode being plural, the controller may allow the received user-set washing mode to be sequentially displayed from a user-set washing mode that is the last received, and the display may display the user-set washing mode, which is the last received, among the plurality of user-set washing modes in response to the power-on of the washing machine.

In response to receiving a search command performed by rotating the inputter in a clockwise direction, the controller may allow the plurality of user-set washing modes to be displayed on the display in reverse order of reception that is the last received user-set washing mode is displayed first.

The inputter may be implemented in a form of a jog dial.

In accordance with another aspect of the disclosure, a washing machine includes a display configured to display an operating state of an external device connected to the washing machine, an inputter configured to receive a control command for the external device, a communication circuitry configured to transmit the received external device control command to the external device, and a controller configured to transmit the control command to the external device in response to receiving the external device control command, and configured to allow an operating state of the external device operating in accordance with the received control command to be displayed on the display.

The communication circuitry may be implemented as a wired communication circuitry or a wireless communication circuitry, and may receive operation state information of the external device.

The external device may include a dryer, and in response to the connection between the washing machine and the dryer in a wired or wireless manner, the display may display a message regarding a state in which the external device control command is received through the inputter.

The inputter may simultaneously receive a control command for the washing machine and a control command for the external device, and the display may simultaneously display an operating state of the washing machine and an operating state of the external device.

The storage may store the received external device control command.

In accordance with another aspect of the disclosure, a control method of a washing machine includes displaying a washing mode, receiving the washing mode select command, storing the selected washing mode, allowing a washing mode, which has the largest number of times selected during a predetermined number of times of washings, to be displayed on a first screen of a display, and in response to the number of the washing mode having the largest number of selection times being plural, allowing a washing mode, which is the last selected among the plurality of washing modes, to be displayed on the first screen of the display.

The control method may further include receiving a washing option change command for the selected washing mode, and the washing option change command may be stored in the storage in response to receiving the washing option change command for the selected washing mode by a predetermined number of times, and the washing mode with the changed washing option may be performed in response to the washing mode being selected again.

The displaying of the washing mode may include displaying the washing mode, which has the largest number of times selected during the predetermined number of times of washings, to be displayed on the first screen of the display in response to powering on of the washing machine, and displaying the washing mode, which is the last selected among the plurality of washing modes, to be displayed on the first screen in response to the number of the washing mode having the largest number of selection times being plural.

The control method may further include displaying a washing option for the selected washing mode, and displaying the changed washing option upon selecting the washing mode in response to receiving the washing option change command for the selected washing mode by the predetermined number of times.

The control method may further include receiving the washing mode search command and the displaying of the washing mode may include displaying the washing mode in a predetermined order according to the received washing mode search command.

In accordance with another aspect of the disclosure, a control method of a washing machine includes displaying a plurality of washing modes, receiving the plurality of washing mode edit commands, storing a washing mode selected according to the washing mode edit command, and allowing the washing mode selected among the plurality of washing modes to be displayed on a display, and allowing a washing mode, which is other than the selected washing mode, not to be displayed on the display.

The control method may further include receiving at least one washing mode select command from a user among the plurality of washing modes, and displaying the at least one washing mode selected according to the received washing mode select command.

The control method may further include receiving at least one washing mode deselect command from a user among the plurality of washing modes, and not displaying the at least one washing mode deselected according to the received washing mode deselect command.

The control method may further include displaying the washing mode in order of selection in response to the number of the washing mode, which is selected according to the washing mode select command, being plural.

The control method may further include receiving the plurality of washing mode search commands, and receiving at least one washing mode select command or washing mode deselect command during searching the plurality of washing modes.

In accordance with another aspect of the disclosure, a control method of a washing machine includes displaying a washing mode, storing the washing mode list, receiving the washing mode search command, allowing the stored washing mode list to be displayed in a predetermined order on a display in response to receiving a search command performed by rotating an inputter in a clockwise direction and allowing a previous washing mode of a washing mode, which is currently being displayed on the display in the washing mode list, to be displayed in response to receiving a search command performed by rotating the inputter in a counterclockwise direction.

The control method may further include preferentially determining a display order of the washing mode list in the washing mode list in proportion to the number of times selected by a user through the inputter, and the displaying of the washing mode may include displaying the washing mode based on the determined display order of the washing mode list in response to the power on of the washing machine.

The control method may further include downloading a new washing mode from a server, and the displaying of the washing mode may include allowing the downloaded new washing mode to be displayed at the end of the washing mode list displayed on the display.

The displaying of the washing mode may include allowing the plurality of downloaded new washing mode lists to be displayed at the end of the washing mode list displayed, which is displayed on the display, in order of download in response to the number of the downloaded new washing mode being plural.

The displaying of the washing mode may include in response to receiving a search command performed by rotating the inputter in a counterclockwise direction, allowing the plurality of downloaded new washing modes to be displayed on the display in reverse order of download that is the last downloaded new washing mode is displayed first.

The control method may further include receiving a user-set washing mode, and storing the received user-set washing mode.

The displaying of the washing mode may include allowing the received user-set washing mode to be displayed prior to the washing mode list displayed on the display, and displaying the received user-set washing mode in response to the power-on of the washing machine.

The displaying of the washing mode may include in response to the number of the received user-set washing mode being plural, allowing the received user-set washing mode to be sequentially displayed from a user-set washing mode that is the last received, and in response to the power-on of the washing machine, displaying the user-set washing mode, which is the last received, among the plurality of user-set washing modes.

The displaying of the washing mode may include in response to receiving a search command performed by rotating the inputter in a clockwise direction, allowing the plurality of user-set washing modes to be displayed on the display in reverse order of reception that is the last received user-set washing mode is displayed first.

In accordance with another aspect of the disclosure, a control method of a washing machine includes displaying an operating state of an external device connected to the washing machine, receiving a control command for the external device, transmitting the received external device control command to the external device, and allowing an operating state of the external device operating in accordance with the received control command to be displayed on a display of the washing machine.

The control method may further include receiving operating state information of the external device.

The control method may further include in response to the connection between the washing machine and the dryer in a wired or wireless manner, displaying a message regarding a state in which the external device control command is received through the inputter.

The control method may further include simultaneously receiving a control command for the washing machine and a control command for the external device, and simultaneously displaying an operating state of the washing machine and an operating state of the external device.

The control method may further include storing the received external device control command.

In accordance with another aspect of the disclosure, a control panel includes a display configured to display an operating state of the washing machine, and an inputter configured to receive the washing mode select command. The display includes a first display area configured to display a washing mode, and a second display area configured to display washing information. The display and the inputter are arranged such that a line passing through the center of the display and a line passing through the center of the inputter are placed on the same line.

The display and the inputter may be arranged to be spaced apart by a predetermined distance, and the inputter may be implemented in a form of a jog dial, and the inputter may include a first inputter configured to receive the washing mode search command and a washing mode select command according to a clockwise rotation or a counter clockwise rotation of the jog dial, a second inputter configured to receive an operation start command or an operation stop command of the washing machine, and a third inputter configured to receive a power on/off command of the washing machine The first inputter, the second inputter, and the third inputter may be arranged such that a line passing through the center of the first inputter, a line passing through the center of the second inputter and a line passing through the center of the third inputter are placed on the same line.

The second display area may include a washing temperature icon configured to indicate a washing temperature, a rinse frequency icon configured to indicate the number of rinses, a spin level icon configured to indicate a spin level, and an additional function icon configured to indicate an additional function of the washing machine.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
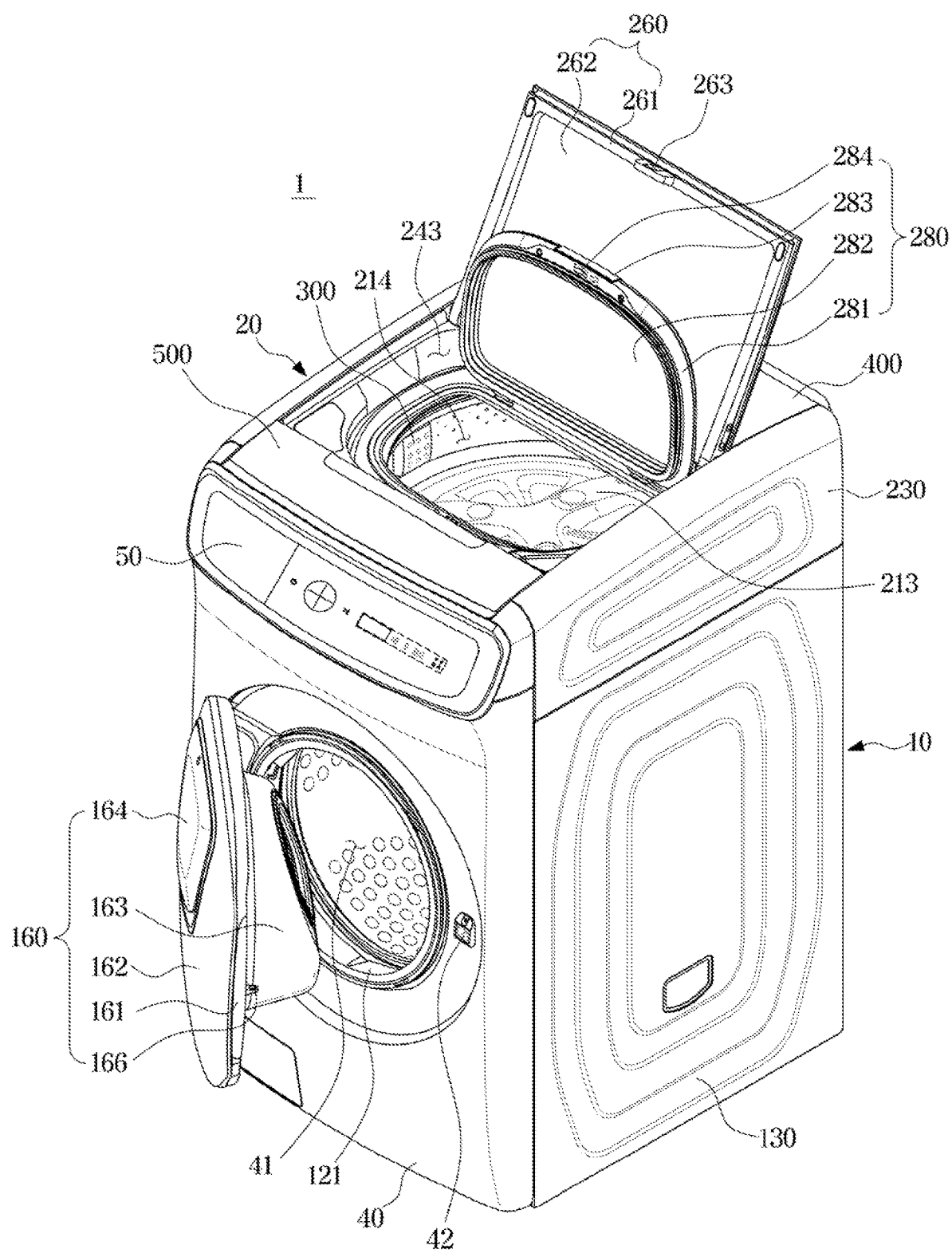
FIG. 1 is a perspective view illustrating a washing machine according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

Figure 2:
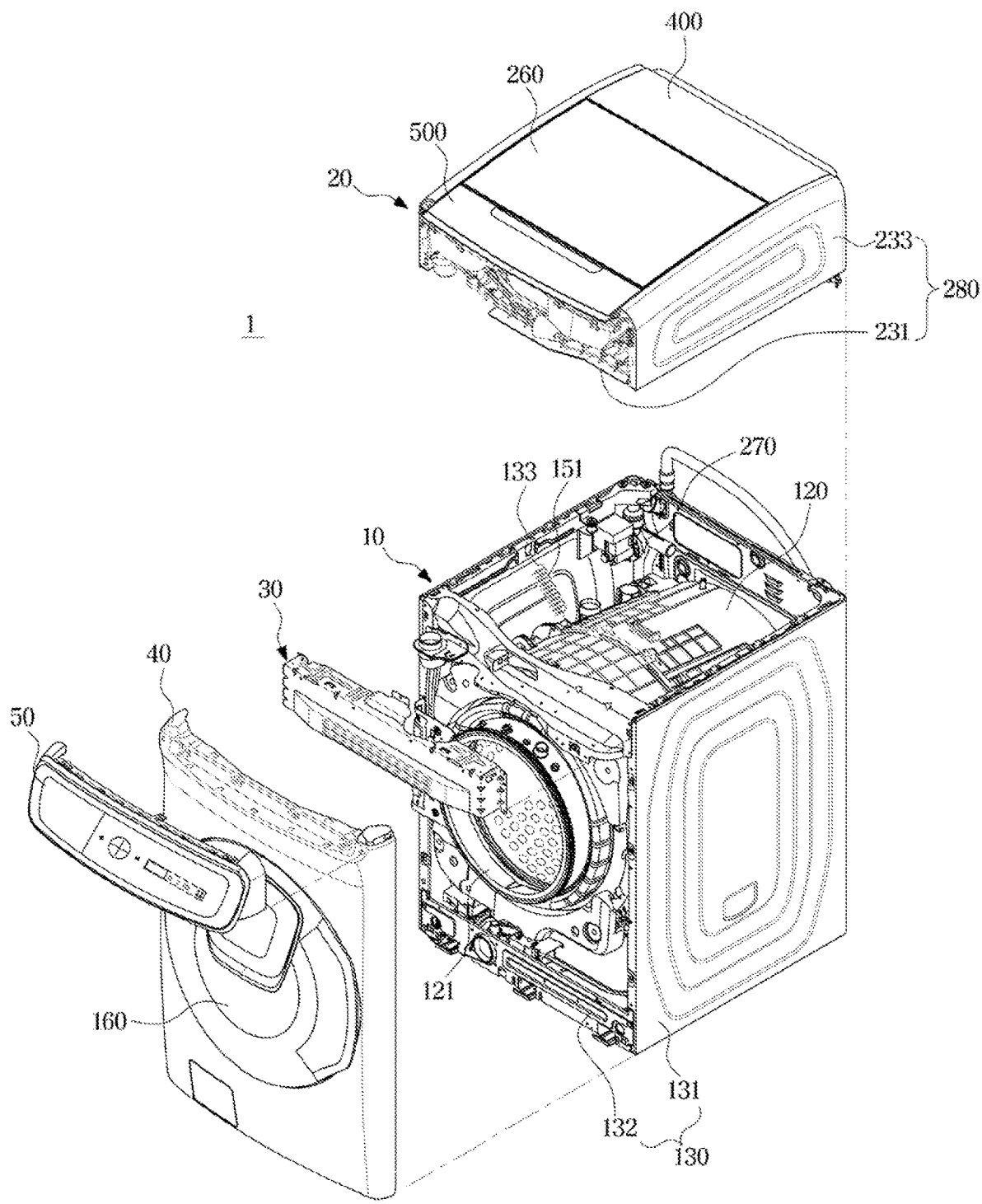
FIG. 2 is a view illustrating a state in which a first washing apparatus and a second washing apparatus of the washing machine shown in FIG. 1 are separated from each other.
Figure 3:
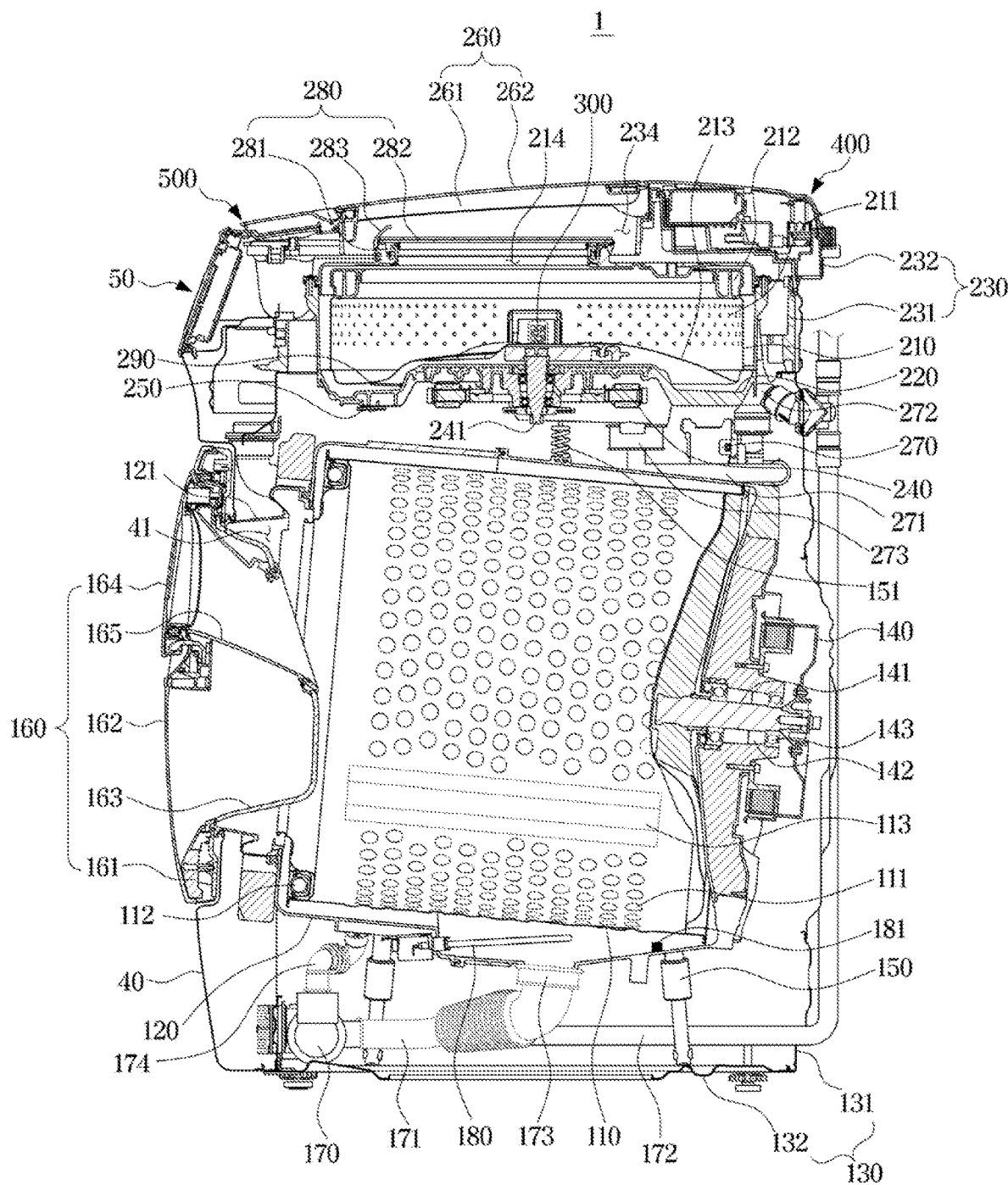
FIG. 3 is a cross-sectional view illustrating the washing machine shown in FIG. 1.

FIG. 1 is a perspective view illustrating a washing machine according to an embodiment of the disclosure. FIG. 2 is a view illustrating a state in which a first washing apparatus and a second washing apparatus of the washing machine shown in FIG. 1 are separated from each other. FIG. 3 is a cross-sectional view illustrating the washing machine shown in FIG. 1.

The washing machine 1 disclosed in FIGS. 1 to 3 is an example of a washing machine 1 in which a washing machine and a control method thereof according to an embodiment is implemented, and the type and shape of washing machines to which the technical feature of the disclosure is applied is not limited thereto.

As illustrated in FIGS. 1 to 3, the washing machine 1 may include a first washing apparatus 10 in the front loading type in which a laundry inlet is provided in the front side and a second washing apparatus 20 in the top loading type in which a laundry inlet is provided in the upper side. The second washing apparatus 20 may be disposed in the upper side of the first washing apparatus 10.

The first washing apparatus 10 may include a first drum 110 in which a first washing space is formed, and a first tub 120 configured to accommodate the first drum 110 and configured to store wash water or rinsing water that is used for a washing cycle or a rinsing cycle. The first drum 110 and the first tub 120 may be provided in a cylindrical shape in which at least a part of one surface thereof is open, and may be disposed such that the open surface faces the front.

The first washing apparatus 10 may include a first housing 130. Particularly, the first housing 130 may include a side frame 131 forming side and rear exteriors, and a bottom frame 132 forming a bottom surface.

In addition, the first washing apparatus 10 may include a spring 151 and a damper 150 configured to support the first tub 120 against the first housing 130. The damper 150 may support the first tub 120 from the lower side by connecting an outer surface of the first tub 120 to the bottom frame 132, and the spring 151 may support the first tub 120 from the upper side by connecting the outer surface of the first tub 120 to a spring connector 133 provided in an upper side of the side frame 131. The spring 151 and the damper 150 may serve to alleviate vibration, noise, and shock generated by movement of the first tub 120.

An installation position of the spring 151 and the damper 150 is not limited to the top of the side frame 131 and the bottom frame 132, and thus if necessary, the spring 151 and the damper 150 may support the first tub 120 by connecting one surface of the first tub 120 to a part of the first housing 130.

The first washing apparatus 10 may include a first drive motor 140 disposed behind the first tub 120 and configured to rotate the first drum 110. A first drive shaft 141 configured to transmit power of the first drive motor 140 may be connected to a rear surface of the first drum 110. A plurality of first through holes 111 for the flow of wash water may be formed around the first drum 110. A plurality of lifters 113 may be installed on an inner circumferential surface of the first drum 110 to allow laundry to be raised and dropped in response to the rotation of the first drum 110. A first balancer 112 may be mounted on a front portion of the first drum 110 to allow the first drum 110 to be stably rotated during high-speed rotation.

The first drive shaft 141 may be disposed between the first drum 110 and the first drive motor 140. One end of the first drive shaft 141 is connected to a rear plate of the first drum 110, and the other end of the first drive shaft 141 extends to the outside of a rear wall of the first tub 120. When the first drive motor 140 drives the first drive shaft 141, the first drum 110 connected to the first drive shaft 141 is rotated around the first drive shaft 141.

A bearing housing 142 may be installed on the rear wall of the first tub 120 to rotatably support the first drive shaft 141. The bearing housing 142 may be formed of an aluminum alloy, and may be inserted into the rear wall of the first tub 120 when the first tub 120 is formed in the injection molding method. Bearings 143 are installed between the bearing housing 142 and the first drive shaft 141 to allow the first drive shaft 141 to be rotated smoothly.

The first washing apparatus 10 may include a function of washing laundry with hot water. In order to obtain hot water, a first heater 180 configured to heat the washing water or rinsing water accommodated in the first tub 120 may be disposed on the bottom of the first tub 120. In addition, the first washing apparatus 10 may further include a temperature sensor 181 configured to detect a temperature of the washing water or rinsing water accommodated in the first tub 120.

The first washing apparatus 10 may include a first drain pump 170 disposed below the first tub 120 so as to discharge water in the first tub 120 to the outside of the washing machine 1, a first connection hose 171 configured to connect a first drain hole 173 of the first tub 120 to the first drain pump 170 so as to allow the water of the first tub 120 to flow into the first drain pump 170, a circulation hose 174 configured to connect the first drain pump 170 to the first tub 120 so as to circulate the water, which flows into the first drain pump 170, toward the first tub 120, and a second drain hose 172 configured to guide water, which is pumped by the first drain pump 170, to the outside of the washing machine 1.

The washing machine 1 may include a front cover 40 provided with a first inlet 41 through which laundry is put into a first laundry space of the first washing apparatus 10, and a first door 160 configured to open and close the first inlet 41 may be coupled to the front cover 40.

The first door 160 may be provided to correspond to the first inlet 41 and rotatable with respect to the front cover 40. The first door 160 may include a first door frame 161, a first door cover 162 and a door glass 163.

The first door frame 161 is formed in an approximately annular shape according to an embodiment, but may be formed in an approximately rectangular shape. The first door cover 162 and the door glass 163 may be formed of a transparent material so as to allow the inside of the first drum 110 to be seen from the outside of the washing machine 1 even when the first door 160 is closed. The door glass 163 may be placed to protrude convexly toward the inside of the first drum 110 from the first door frame 161. By this configuration, the door glass 163 may be inserted into the first inlet 41 in response to the close of the first door 160.

In order to allow the first door 160 to be rotated with respect to the front cover 40, a first hinge is provided around the first inlet 41 and then coupled to a first hinge coupler formed on one side of the first door frame 161. A first hook 166 is provided on the other side of the first door frame 161, and a first hook receiver 42 is provided in the front cover 40 to correspond to the first hook 166. Accordingly, the first door 160 may be maintained in a state of closing the first inlet 41.

In order to put laundry into the first laundry space even when the first door 160 is closed, the first door 160 may include an auxiliary laundry inlet and an auxiliary door 164 configured to open and close the auxiliary laundry inlet. The auxiliary door 164 may be rotatably mounted on the first door cover 162.

In order to put laundry into the washing machine through the auxiliary laundry inlet of the first door 160, the laundry needs to pass through the door glass 163. To this end, a glass through hole is provided in the door glass 163. Alternatively, an upper portion of the door glass may be recessed to prevent the door glass from being disposed behind the auxiliary laundry inlet.

In order to connect the auxiliary laundry inlet of the first door 160 to the glass through hole of the door glass 163, the first door 160 may include a connection guide 165. The connection guide 165 may be formed in the tubular shape having both ends open and having a hollow portion.

Particularly, one end of the connection guide 165 is connected to the auxiliary laundry inlet, and the other end of the connection guide 165 is connected to the glass through hole. In an embodiment, the connection guide 165 may be provided to incline downward from the front to the rear. That is, one end of the connection guide 165 connected to the auxiliary laundry inlet is at a higher position than the other end. By this configuration, it is easy to put laundry into the first drum 110 through the auxiliary laundry inlet.

In an embodiment, it has been described that the auxiliary door 164 is provided in the first door 160, but is not limited thereto. Therefore, the first door 160 may be provided without the auxiliary laundry inlet, the auxiliary door, and the connection guide.

The first washing apparatus 10 may include a diaphragm 121 disposed between the first inlet 41 of the front cover 40 and an opening of the first tub 120. The diaphragm 121 may form a passage from the first inlet 41 to the opening of the first tub 120, and thus the diaphragm 121 may reduce vibration transmitted toward the front cover 40 that is generated upon the rotation of of the first drum 110. In addition, a part of the diaphragm 121 may be disposed between the first door 160 and the front cover 40 to prevent the washing water of the first tub 120 from leaking to the outside of the washing machine 1.

The second washing apparatus 20 may include a second drum 210 in which a second washing space is formed, and a second tub 220 configured to accommodate the second drum 210 and configured to store washing water or rinsing water that is used for a washing cycle or a rinsing cycle. The second drum 210 and the second tub 220 may be provided in a cylindrical shape in which at least a part of one surface thereof is open, and may be disposed such that the open surface faces the upper side.

The second washing apparatus 20 may include a second housing 230. Particularly, the second housing 230 may include a lower frame 231 on which the second tub 220 is supported, and an upper frame 232 in which a second inlet 234, through which the laundry is put to the second washing space, is provided and seated on an upper side of the lower frame 231. In addition, the second housing 230 may include a side cover 233 configured to form a left side and right side exterior.

The second washing apparatus 20 may include a second door 260 configured to open and close the second inlet 234. The second door 260 may be provided to correspond to the second inlet 234 and rotatable with respect to the upper frame 232. The second door 260 may include a second door frame 261 and a second door cover 262. The second door cover 262 may be formed of a transparent material so as to allow the inside of the second tub 220 and the second drum 210 to be seen from the outside of the washing machine 1 even when the second door 260 closes the second outlet 234.

In order to allow the second door 260 to be rotatable with respect to the upper frame 232, a second hinge is provided in the left and right side of the second door frame 261 and then coupled to a second hinge coupler formed around the second inlet. A latch receiver 263 is provided on the front side of the second door frame 261, and a latch is provided in the upper frame 232 to correspond to the latch receiver 263 of the second door frame 261. Accordingly, the second door 260 may be maintained in a state of closing the second inlet 234 during the operation of the second washing apparatus 20.

The second drum 210 may be provided in a cylindrical shape with an open top surface, and may be disposed so as to be rotatable in the second tub 220. A plurality of second through holes 211 for the flow of washing water may be formed in the side and bottom of the second drum 210. A second balancer 212 may be mounted on the second drum 210 to allow the second drum 210 to be stably rotated during high-speed rotation. A filter 300 configured to filter out foreign substances that may be generated in the washing may be mounted on an inner surface of the second drum 210.

A bent portion 213 configured to generate water current may be formed on the bottom of the second drum 210. Although not shown in the drawings, the second washing apparatus 20 may further include a pulsator disposed in the second drum 210 to generate water current.

The second tub 220 is provided in a cylindrical shape and may be supported by the lower frame 231 by a suspension device 250. Particularly, the second tub 220 may be supported in a form of being suspended from the lower frame 231 by the four suspension devices 250. A third inlet 214 may be provided on the upper surface of the second tub 220 to correspond to the second inlet 234, and a third door 280 configured to open and close the third inlet 214 may be coupled to the upper surface of the second tub 220.

The third door 280 may include a third door frame 281 and a third door cover 282. The third door cover 282 may be formed of a transparent material so as to allow the inside of the second tub 220 to be seen from the outside of the second tub 220 even when the third door 280 closes the third outlet 214.

In order to allow the third door 280 to be rotatable with respect to the second tub 220, a third hinge is provided around the third inlet 214 and then coupled to a third hinge coupler formed on one side of the third door frame 281. A handle 283 configured to open the third door 280 may be provided on the other side of the third door frame 281 and a second hook 284 may be provided on the handle 283. In the second tub 220, a second hook receiver may be provided to correspond to the second hook 284 and thus the second door 280 may be maintained in a state of closing the third inlet 214. In addition, when a user pulls the handle 283, the second hook 284 may be separated from the second hook receiver, thereby opening the third door 280.

The second washing apparatus 20 may include a second drive motor 240 disposed on the outside of the lower side of the second tub 220 and configured to rotate the second drum 210. A second drive shaft 241 configured to transmit power of the second drive motor 240 may be connected to the bottom of the second drum 210. One end of the second drive shaft 241 is connected to a bottom plate of the second drum 210, and the other end of the second drive shaft 241 extends to the outside of a lower wall of the second tub 220. When the second drive motor 240 drives the second drive shaft 241, the second drum 210 connected to the second drive shaft 241 is rotated around the second drive shaft 241.

Although not shown in the drawing, when the pulsator is disposed on the bottom of the second drum 210, the second washing apparatus may further include a power transfer device to simultaneously or selectively transfer driving force, which is generated by the second drive motor 240, to the second drum 210 and the pulsator.

The second washing apparatus 20 may include a function of washing laundry with hot water. In order to obtain hot water, a second heater 290 configured to heat the washing water or rinsing water accommodated in the second tub 220 may be disposed on the bottom of the second tub 220.

A second drain pump 270 configured to discharge the water in the second tub 220 to the outside of the washing machine 1 may be disposed in the first washing apparatus 10. Particularly, the first washing apparatus 10 may include the second drain pump 270 disposed in the upper portion of the first housing 130, and the first washing apparatus 10 may include a second drain hose 272 configured to guide water, which is pumped by the second drain pump 270, to the outside of the washing machine 1.

A second drain hole 273 configured to discharge water from the second tub 220 may be formed at the bottom of the second tub 220, and the second drain hole 273 may be connected to the second drain pump 270 through a second connection hose 271 to allow the water of the second tub 22 to flow into the second drain pump 270.

The second washing apparatus 20 may include a water supply device 400 configured to supply water to the second tub 220 and the first tub 110 of the first washing apparatus 10. The water supply device 400 may be disposed in the first housing 230. Particularly, the water supply device 400 may be disposed in the upper frame 232, and it may be appropriate that the water supply device 400 is disposed in the rear of the second inlet 234.

In addition, the second washing apparatus 20 may include a detergent supply device 500 configured to supply detergent to the first washing apparatus 10. The detergent supply device 500 may be disposed in the first housing 230. Particularly, the detergent supply device 500 may be disposed on the upper frame 232, and it may be appropriate that the water supply device 400 is disposed in the front of the second inlet 234.

The washing machine 1 may include a control panel 50 disposed on in the upper side of the front cover 40 and configured to manipulate the first washing apparatus 10 and the second washing apparatus 20. The control panel 50 may include an inputter 51 configured to receive an operation command of the washing machine 1 from a user and a display 52 configured to display operation information of the washing machine 1. In this case, the inputter 51 and the display 52 may be implemented as a single touch screen.

Hereinafter for convenience of description, it is assumed that the control panel 50 is implemented as a touch screen.

Figure 4:
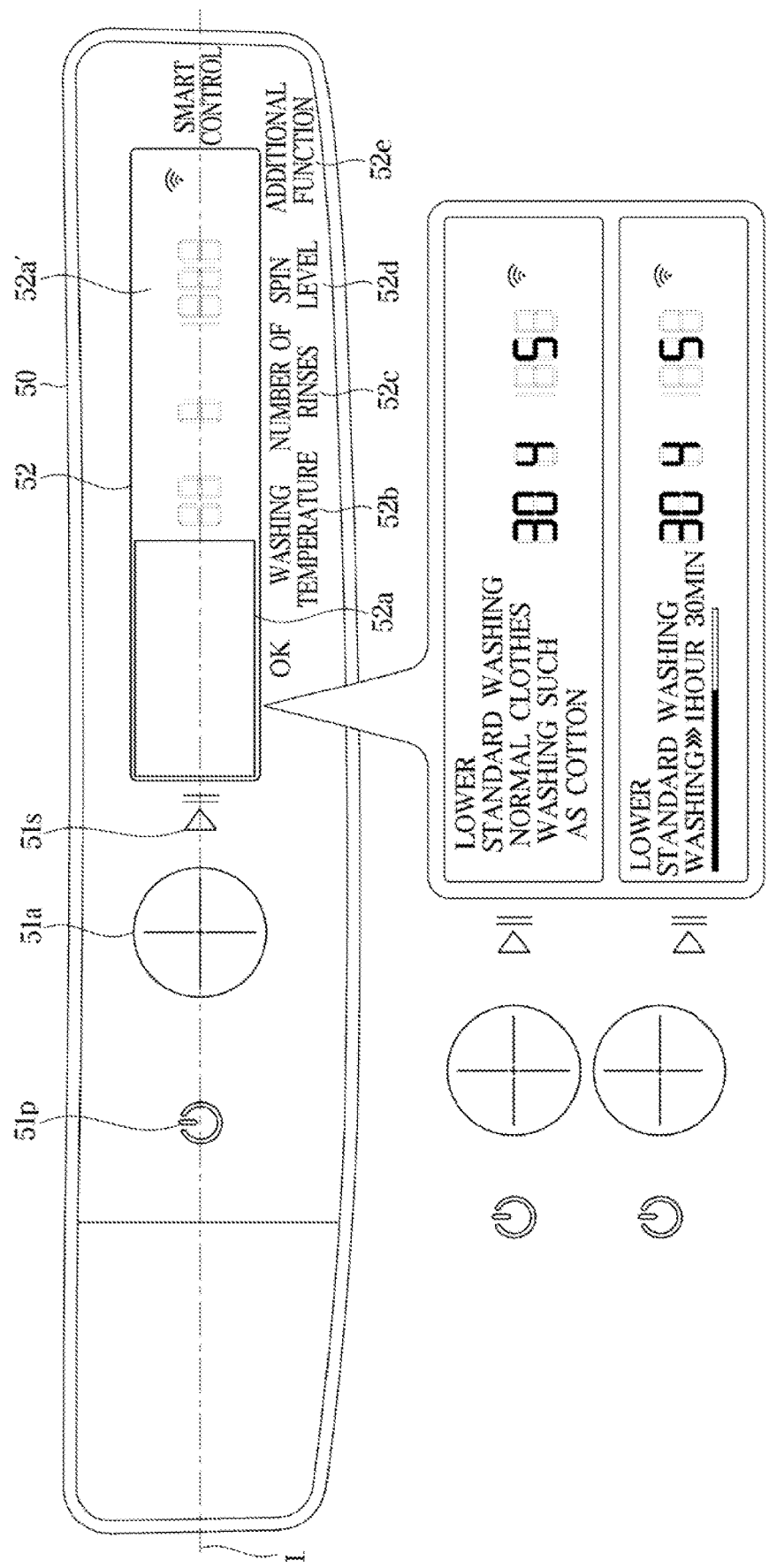
FIG. 4 is a view illustrating a control panel according to an embodiment of the disclosure.
Figure 5:
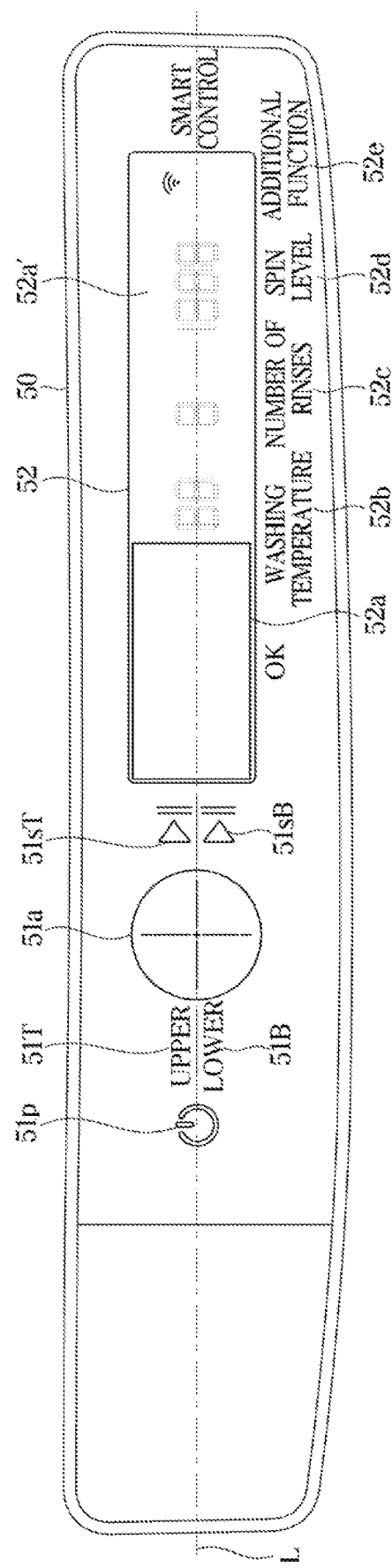
FIG. 5 is a view illustrating the control panel according to an embodiment of the disclosure.
Figure 6:
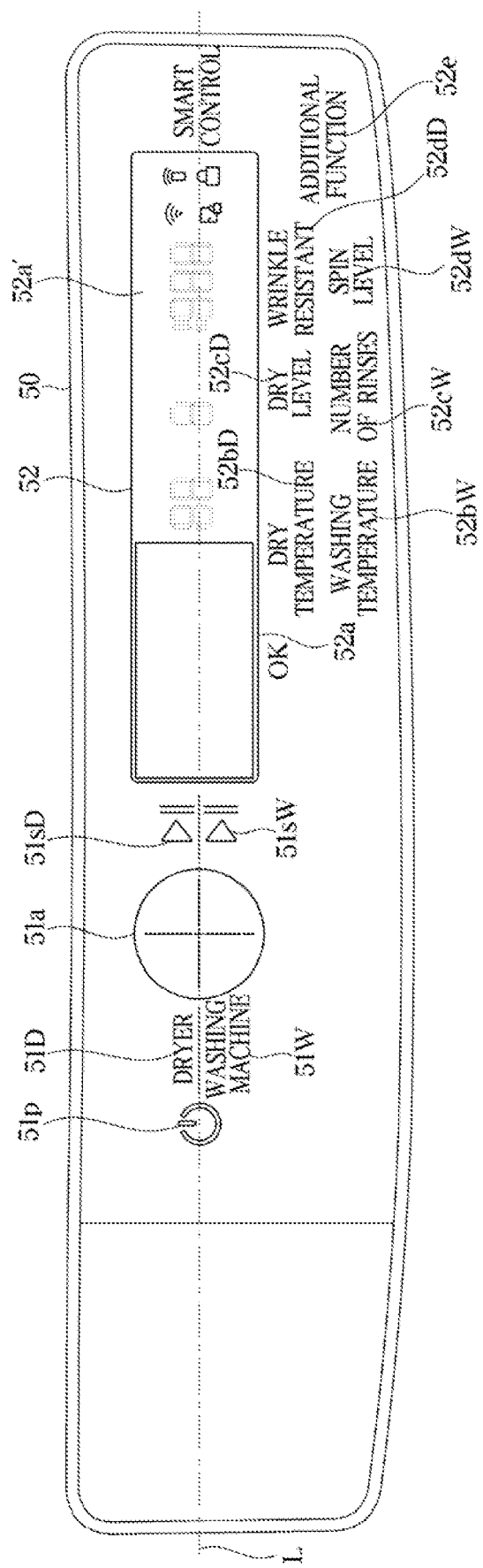
FIG. 6 is a view illustrating the control panel according to an embodiment of the disclosure.

FIGS. 4 to 6 are views illustrating a control panel according to an embodiment of the disclosure.

Referring to FIGS. 4 to 6, the control panel 50 may include the inputter 51 configured to receive a control command of the washing machine 1 and the display 52 on which operation information and various kinds of information of the washing machine 1 is displayed.

The display 52 may include a first display area 52a configured to display a washing mode of the washing machine 1 and a second display area 52a' configured to display washing information. In this case, the first display area 52a is the same area as a display window 52a configured to display information related to the washing mode and operating state of the washing machine 1 as described later.

In addition, a washing temperature icon 52b configured to indicate a washing temperature, a rinse frequency icon 52c configured to indicate the number of rinses, a spin level icon 52d configured to indicate a spin level, and an additional function icon 52e configured to indicate additional functions of the washing machine 1 may be displayed in the second display area 52a'.

As illustrated in FIG. 4, on the control panel 50, the display 52 and the inputter 51 may be arranged in such a way that a line L passing through the center of the display 52 and a line L passing through the center of the inputter 51 are placed on the same line. Further, the display 52 and the inputter 51 may be spaced apart from each other by a predetermined distance, and the display 52 and the inputter 51 are arranged in a line on a straight line, thereby realizing simplicity of the arrangement of the inputter 51 and the display 52 of the control panel 50.

Referring to FIGS. 4 to 6, an inputter 51a formed in a jog dial type and configured to receive a washing mode search and select command of the washing machine 1 may be provided on the control panel 50. In order to describe the arrangement of the inputter 51 and the display 52 on the control panel 50, the inputter 51a implemented in the form of a jog dial is defined as a 'first inputter 51a'.

Further, an operation start icon 51S configured to receive a control command to start or stop the operation of the washing machine 1 may be displayed on the control panel 50. As described above, in order to describe the arrangement of the inputter 51 and the display 52 on the control panel 50, the operation start icon 51S is defined as a 'second inputter 51S'.

A power icon 51P configured to control turning on/off of the power of the washing machine 1 may be displayed on the control panel 50. In response to touching of the power icon 51P, the control panel 50 may receive a power turn on command. In response to receiving of the power turn on command through the touch of the power icon 51P, the power may be supplied to the washing machine 1 and as a result, the control panel 50 may display selectable various objects, as illustrated in FIGS. 4 to 6.

As described above, in order to describe the arrangement of the inputter 51 and the display 52 on the control panel 50, the power icon 51P is defined as a 'third inputter 51P'.

As illustrated in FIG. 4, the first inputter 51a, the second inputter 51S and the third inputter 51P may be arranged in such a way that a line L passing through the center of the first inputter 51a, a line L passing through the center of the second inputter 51S, and a line L passing through the center of third inputter 51P are placed on the same line.

Further, the first inputter 51a, the second inputter 51S, and the third inputter 51P may be disposed to be spaced apart from each other by a predetermined distance, and the first inputter 51a, the second inputter 51S, and the third inputter 51P are arranged in a line on a straight line, thereby realizing simplicity of the arrangement on the control panel 50.

As mentioned above, the washing temperature icon 52b configured to indicate a washing temperature, the rinse frequency icon 52c configured to indicate the number of rinses, the spin level icon 52d configured to indicate a spin level, and the additional function icon 52e configured to indicate additional functions of the washing machine 1 may be displayed in the second display area 52a' of the display 52.

Referring to FIG. 4, a content displayed on the display window 52a of the washing machine 1, that is, the first display area 52a, indicates that a washing mode is 'standard washing' mode, and a content displayed on the second display area 52a' indicates that a washing temperature is 30° C., the number of rinses is four times, and the spin level is level 5.

In addition, referring to FIG. 5, icons regarding to the first washing apparatus 10 positioned at the lower portion of the washing machine 1 and the second washing apparatus 20 positioned at the upper portion of the washing machine 1 may be displayed on the control panel 50.

An upper washing apparatus selection icon 51T configured to receive a command to select the second washing apparatus 20 or configured to display an operating state, and a lower washing apparatus selection icon 51B configured to receive a command to select the first washing apparatus 10 or configured to display an operating state may be displayed on the control panel 50.

The upper washing apparatus selection icon 51T and the lower washing apparatus selection icon 51B may be displayed symmetrically up and down with respect to the line L passing through the center of the display 52 and the line L passing through the center of the inputter 51.

In addition, an upper washing apparatus operation start icon 51ST configured to receive a control command to start or stop the operation of the second washing apparatus 20 and a lower washing apparatus operation start icon 51SB configured to receive a control command to start or stop the operation of the first washing apparatus 10 may be displayed on the control panel 50.

As mentioned above, the upper washing apparatus operation start icon 51ST and the lower washing apparatus operation start icon 51SB may be displayed symmetrically up and down with respect to the line L passing through the center of the display 52 and the line L passing through the center of the inputter 51.

In addition, referring to FIG. 6, icons for each of the washing machine 1 and an external device (e.g., a dryer) connected to the washing machine 1 may be displayed on the control panel 50.

An external device selection icon 51D configured to receive a command to select an external device, which is connected to the washing machine 1, or configured to display an operating state of the external device, and a washing machine selection icon 51W configured to receive a washing machine 1 select command or configured to display an operating state of the washing machine 1 may be displayed on the control panel 50.

The external device selection icon 51D and the washing machine selection icon 51W may be displayed symmetrically up and down with respect to the line L passing through the center of the display 52 and the line L passing through the center of the inputter 51.

In addition, an external device operation start icon 51SD configured to receive a control command to start or stop the operation of the external device and a washing machine operation start icon 51SW configured to receive a control command to start or stop the operation of the washing machine 1 may be displayed on the control panel 50.

As mentioned above, the external device operation start icon 51SD and the washing machine operation start icon 51SW may be displayed symmetrically up and down with respect to the line L passing through the center of the display 52 and the line L passing through the center of the inputter 51.

In addition, a drying temperature icon 52bD configured to indicate a drying temperature of the external device, a dry level icon 52cD configured to indicate a dry level, and a wrinkle resistant icon 52dD configured to indicate a wrinkle resistant function may be displayed on the display 52. In addition, a washing temperature icon 52bW configured to indicate the washing temperature of the washing machine 1, a rinse frequency icon 52cW configured to indicate the number of rinses, and a spin level icon 52dW configured to indicate a spin level may be displayed on the display 52.

Figure 7:
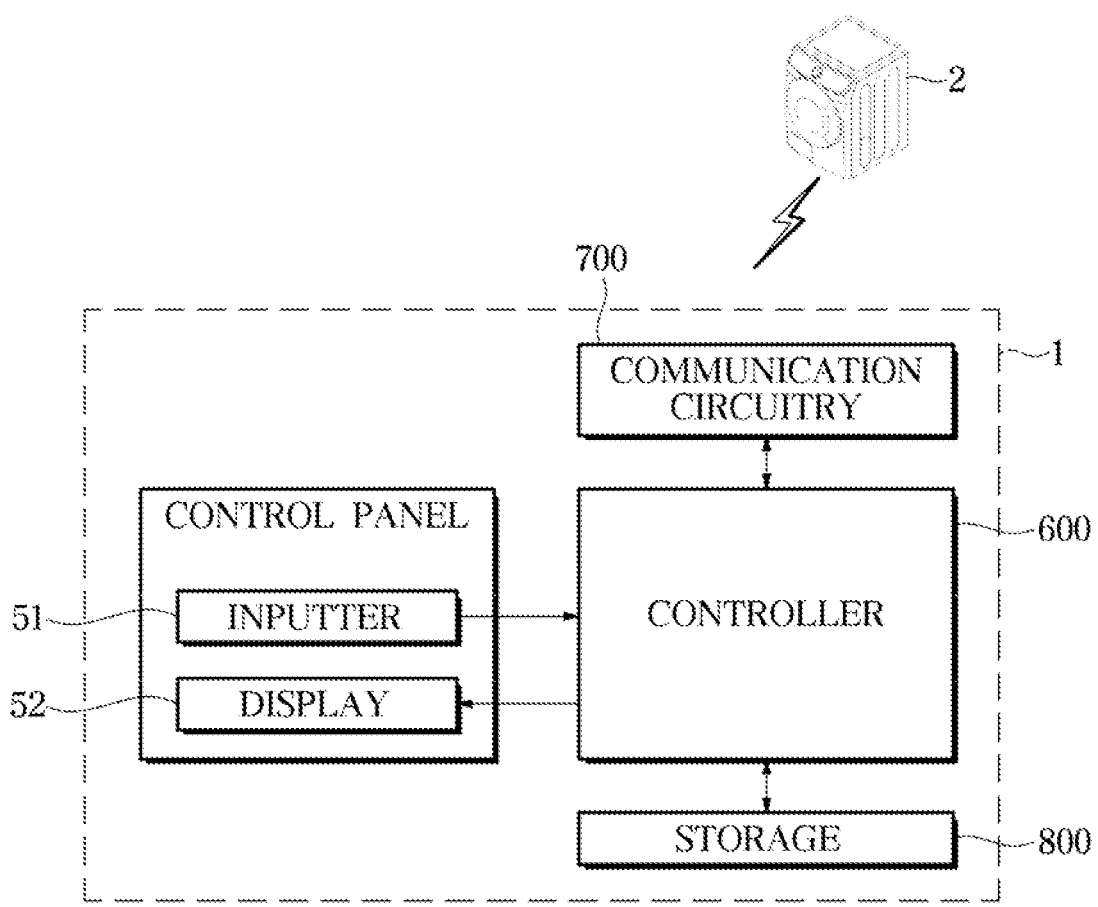
FIG. 7 is a control block diagram illustrating the washing machine according to an embodiment of the disclosure.

FIG. 7 is a control block diagram illustrating the washing machine according to an embodiment of the disclosure.

Referring to FIG. 7, the washing machine 1 according to an embodiment may include the control panel 50 configured to perform input and output related to the operation of the washing machine 1, a controller 600 configured to control each components related to the operation of the washing machine 1, a communication circuitry 700 configured to communicate with an external device 2 connected to the washing machine 1 in a wired or wireless manner, and a storage 800 configured to store data related to the operation and the control of the washing machine 1.

The control panel 50 may include the inputter 51 configured to receive an operation command of the washing machine 1 from a user and the display 52 configured to display operation information of the washing machine 1.

The controller 600 may control the operation of the washing machine 1 and allow information related to the operation of the washing machine 1 to be displayed on the display 52.

The communication circuitry 700 may communicate with the external device 2 connected to the washing machine 1 to transmit and receive operation information of the washing machine 1 and the external device 2. In an embodiment of the disclosure, the external device 2 is described with a dryer as an example, but the type and shape of the external device 2 are not limited thereto.

In addition, the communication circuitry 700 may access a server through a network to download or upload a control program or control data related to the operation of the washing machine 1 from or to the server.

The communication circuitry 700 may be implemented using a communication chip, an antenna, and related components to access at least one of a wired communication network and a wireless communication network. That is, the communication circuitry 700 may be implemented as various types of communication modules configured to perform short-range communication or long-distance communication with the external device 2. That is, the communication circuitry 700 may include a wired communication module for transmitting and receiving data to and from the external device 2 in a wired manner, and a wireless communication module for transmitting and receiving data in a wireless manner.

The storage 800 may store a control program and control data for controlling the washing machine 1 or may store a control command input from a user. The storage 800 may include volatile memories (not shown) such as Static Random Access Memory (S-RAM), and Dynamic Random Access Memory (D-RAM), and non-volatile memories (not shown) such as Flash memory, Read Only Memory, Erasable Programmable Read Only Memory (EPROM), and Electrically Erasable Programmable Read Only Memory (EEPROM).

Figure 8A:
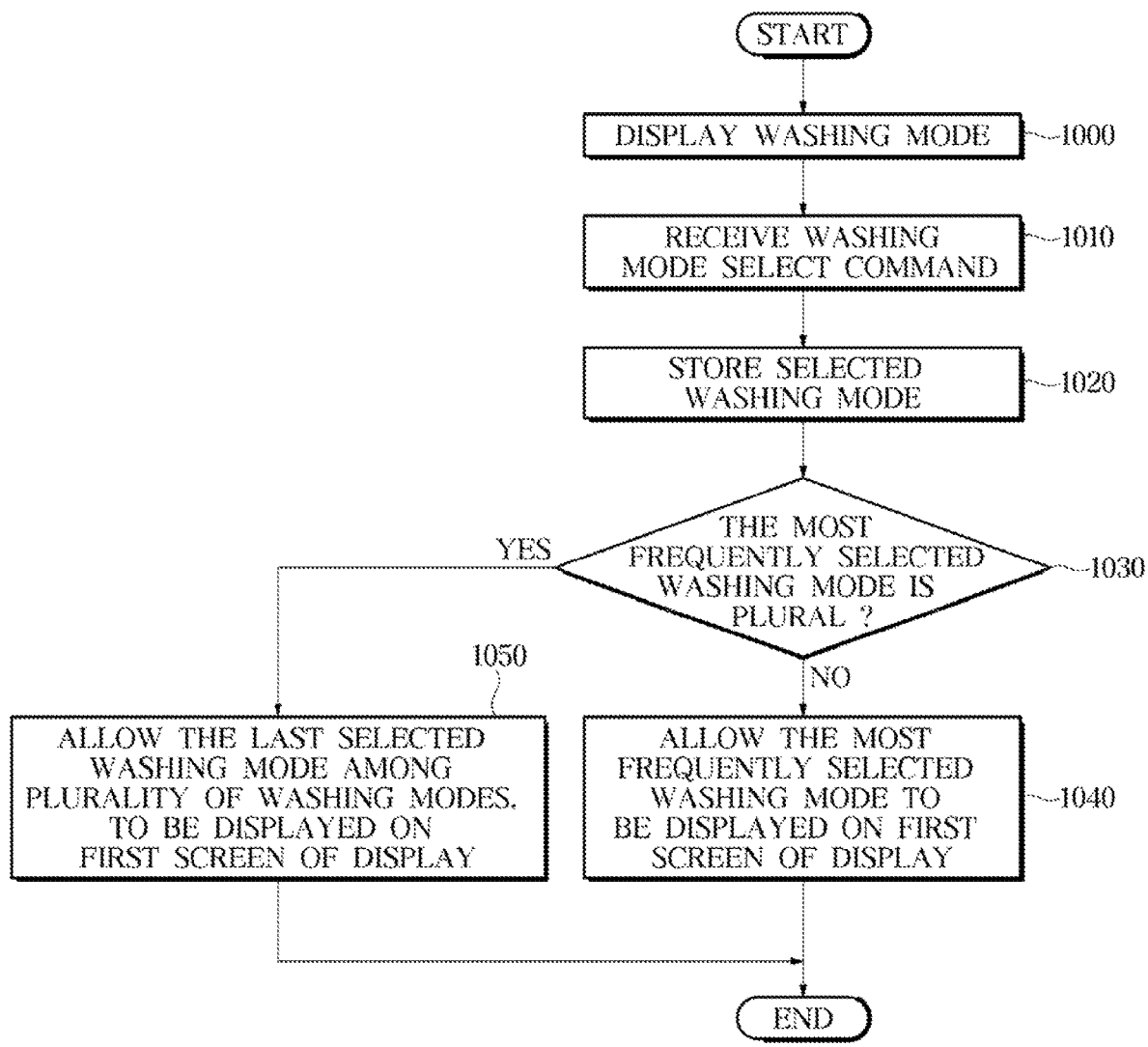
FIG. 8A is a flow chart illustrating a washing mode display control method according to an embodiment of the disclosure.
Figure 8B:
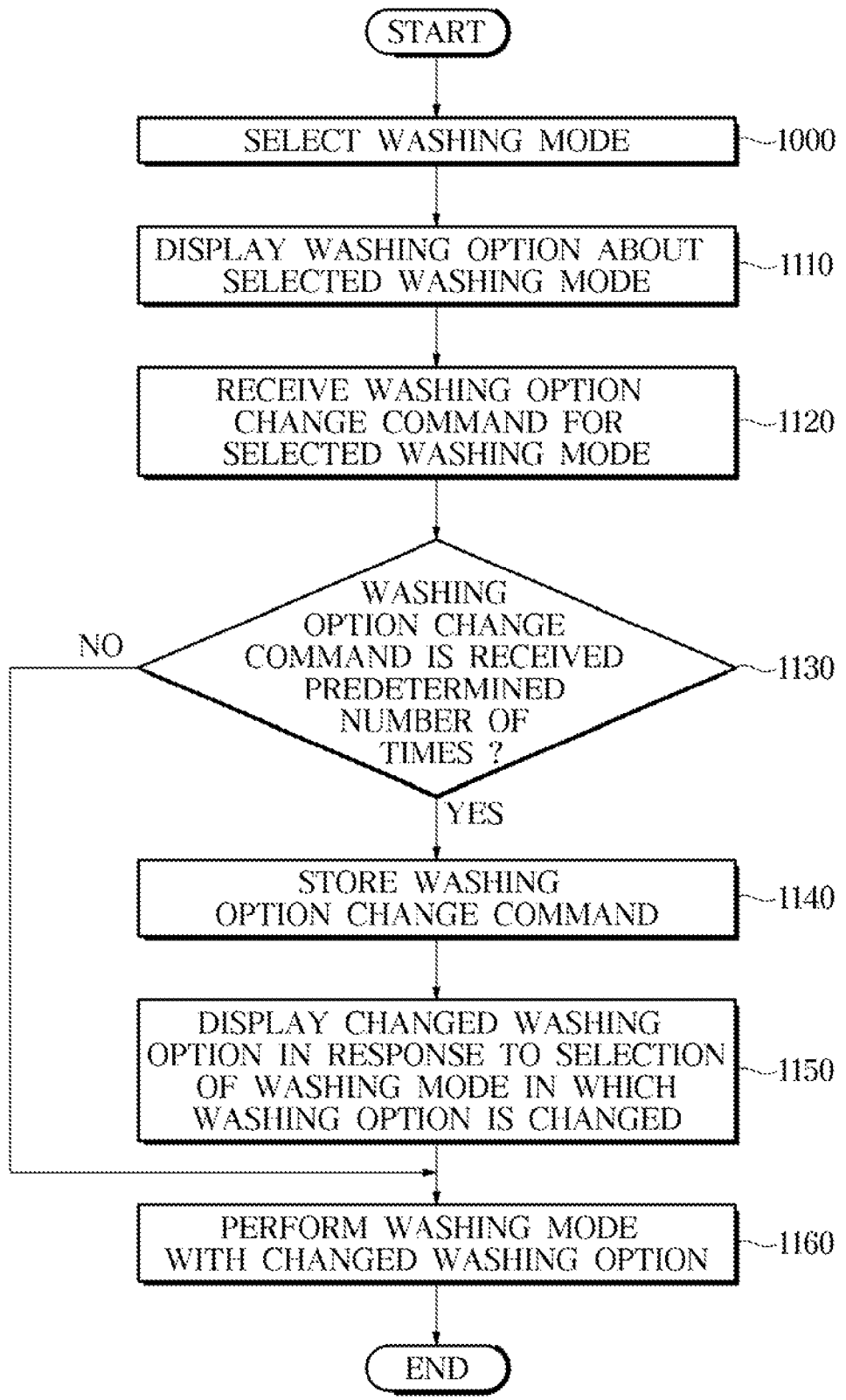
FIG. 8B is a flow chart illustrating the washing mode display control method according to an embodiment of the disclosure.
Figure 9:
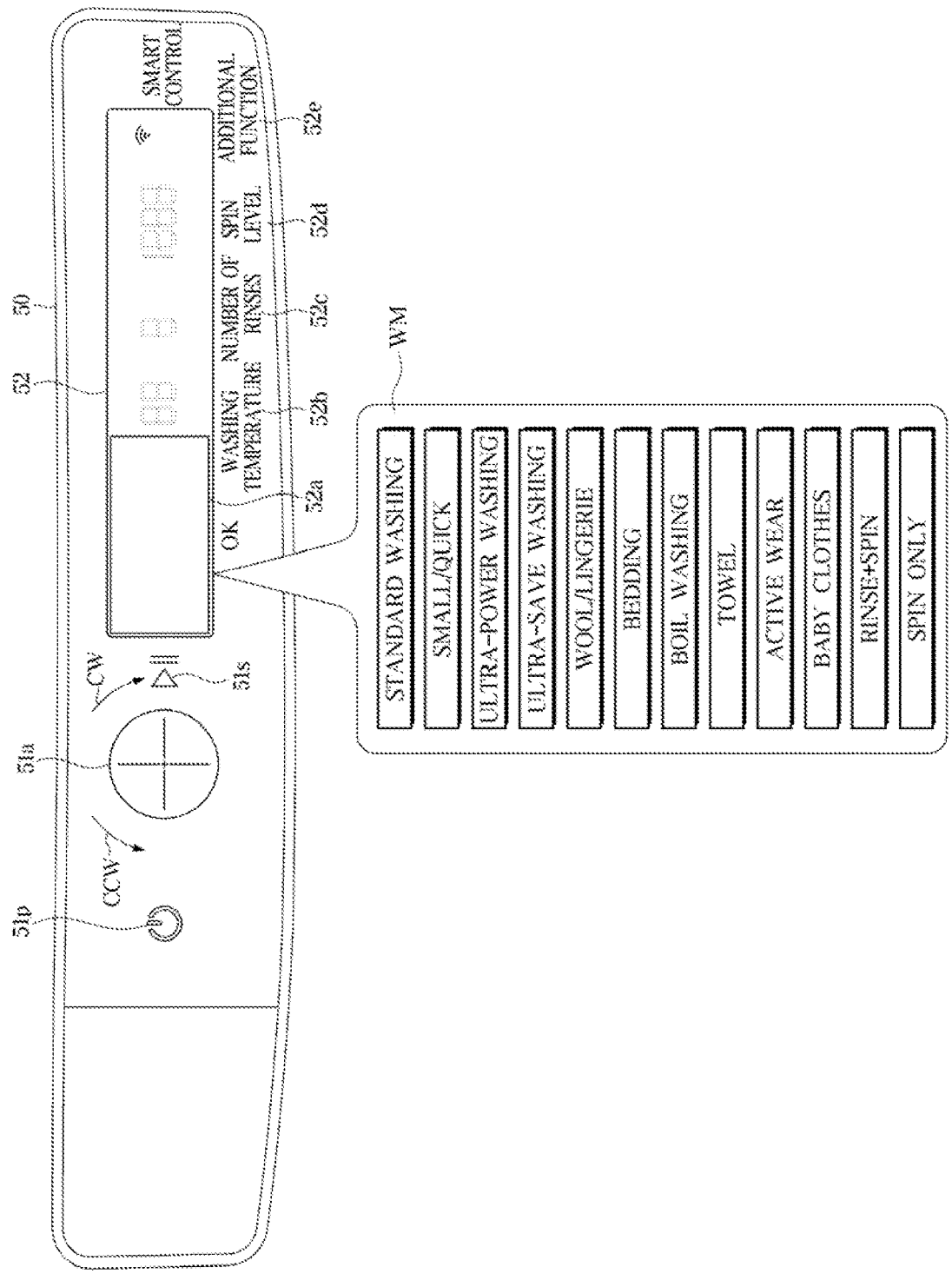
FIG. 9 illustrates that a washing mode of the washing machine is displayed according to an embodiment of the disclosure.
Figure 10:
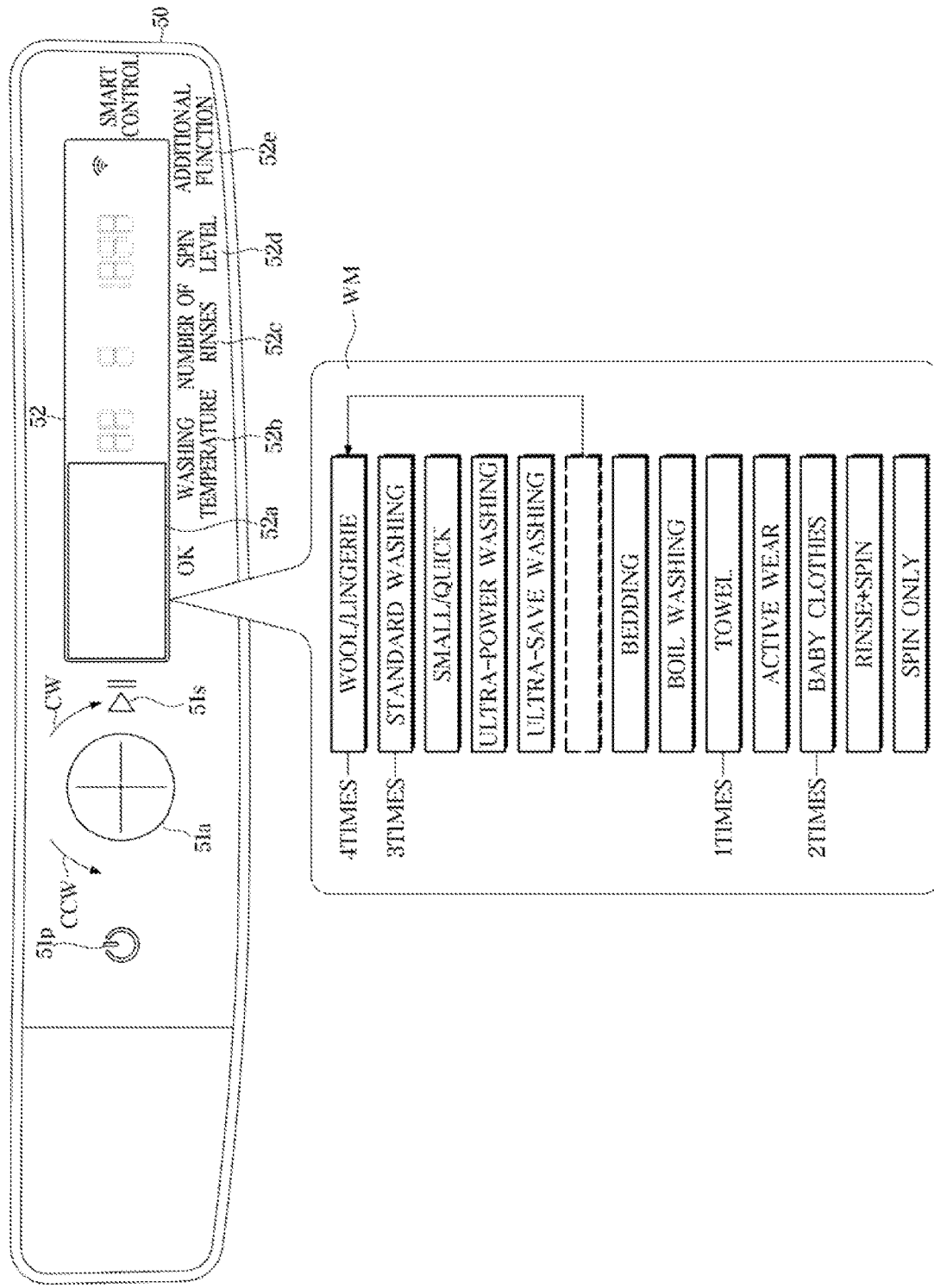
FIG. 10 illustrates that a washing mode, which is selected the large number of times, is controlled to be preferentially displayed according to an embodiment of the disclosure.
Figure 11:
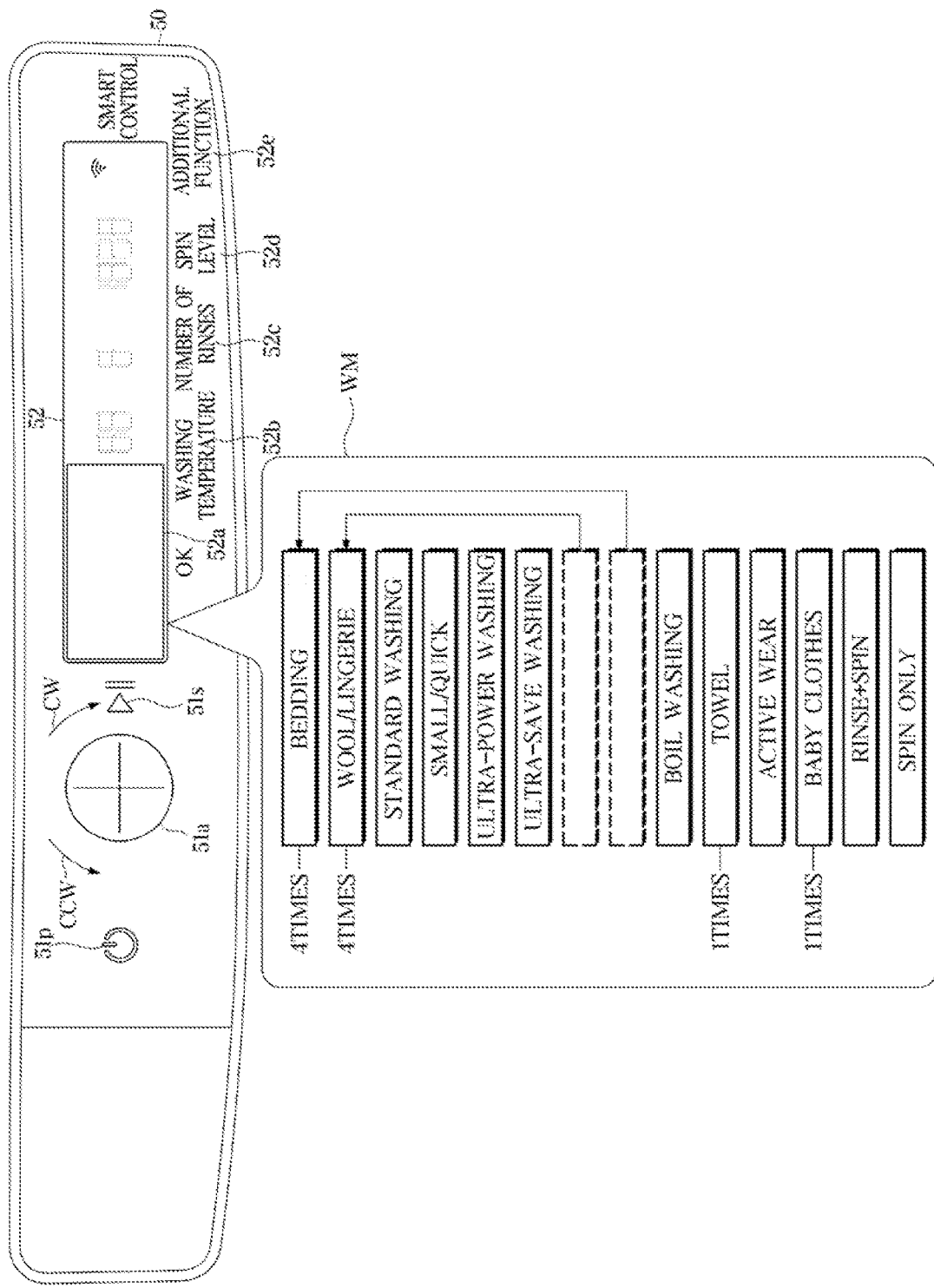
FIG. 11 illustrates that a washing mode, which is selected the large number of times, is controlled to be preferentially displayed according to an embodiment of the disclosure.
Figure 12:
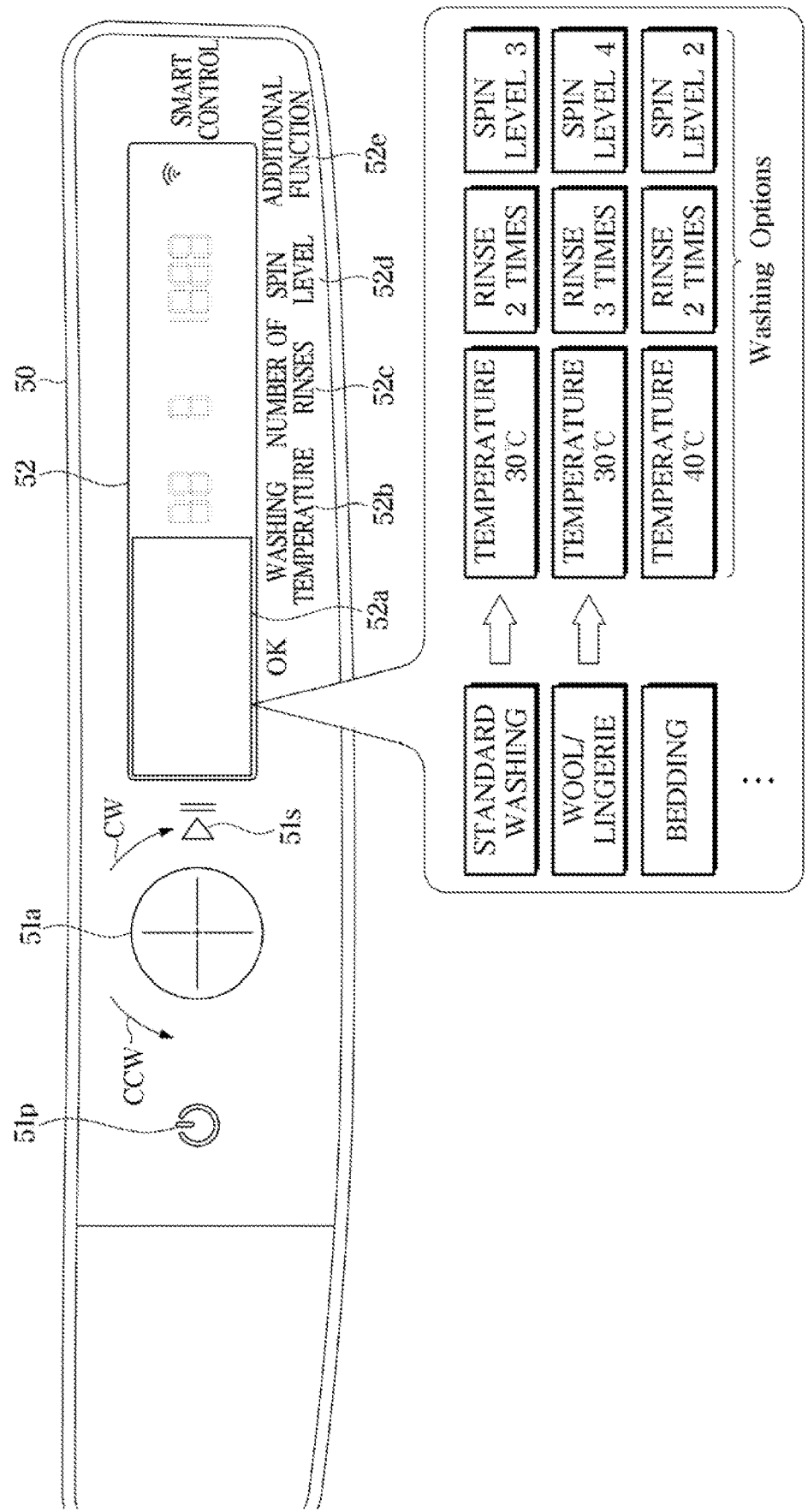
FIG. 12 illustrates that a washing option related to the selected washing mode is displayed according to an embodiment of the disclosure.
Figure 13:
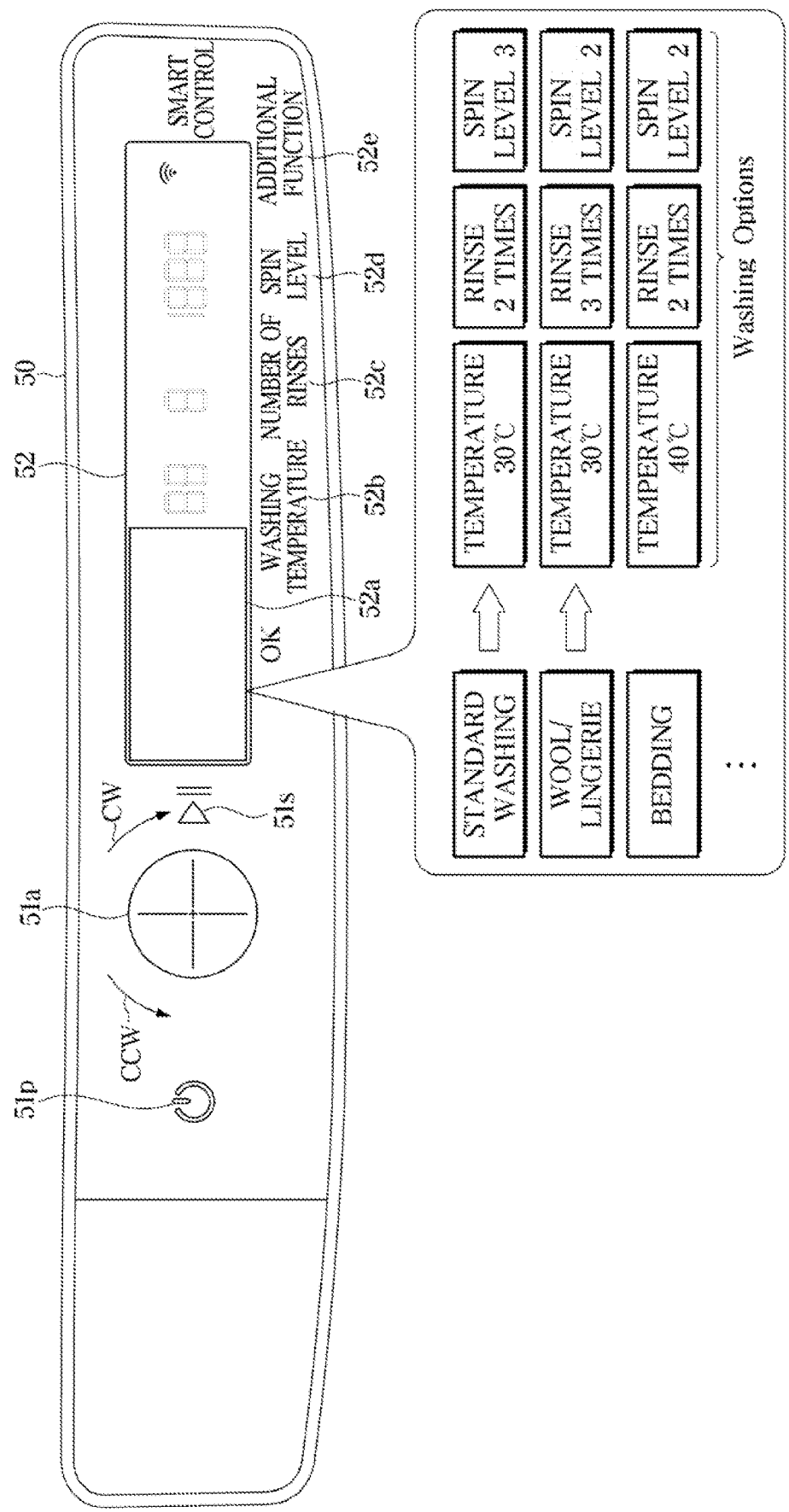
FIG. 13 illustrates that the changed washing option is displayed in response to the selection of the washing mode according to an embodiment of the disclosure.

FIGS. 8A and 8B are flow charts illustrating a washing mode display control method according to an embodiment of the disclosure. FIG. 9 illustrates that a washing mode of the washing machine is displayed according to an embodiment of the disclosure. FIGS. 10 and 11 illustrate that a washing mode, which is selected the large number of times, is controlled to be preferentially displayed according to an embodiment of the disclosure. FIG. 12 illustrates that a washing option related to the selected washing mode is displayed according to an embodiment of the disclosure. FIG. 13 illustrates that the changed washing option is displayed in response to the selection of the washing mode according to an embodiment of the disclosure.

Referring to FIG. 9, a washing mode WM of the washing machine 1 may be displayed on the display window 52*a* of the display 52 (1000). That is, in response to the power-on of the washing machine 1, a washing mode list, which is previously stored, may be displayed one by one on the display window 52*a*.

A user may search for a washing mode included in the washing mode list by rotating the inputter 51*a*, which is implemented in a form of a jog dial, clockwise CW or counterclockwise CCW.

The inputter 51 may receive a washing mode select command from a user (1010). That is, the user may select a washing mode to perform washing while searching for a washing mode, and the storage 800 may store the washing mode selected by the user (1020). The washing machine 1 may perform washing on laundry in the washing mode, which selected by the user, under the control of the controller 600.

The controller 600 may identify the number of times of washings for each washing mode selected by a user during a predetermined number of times of washings based on the number of selection times of the washing mode stored in the storage 800. That is, when the user performs 10 times of washings using the washing machine 1 for a certain period, the controller 600 may identify the frequency of selection of the selected washing mode for each washing, and thus the controller 600 may identify a washing mode that is the most frequently selected for 10 times of washings. The number of times of washing, which is pre-determined to identify the frequency of selection of the washing mode, may vary according to the setting.

The controller 600 may identify whether a washing mode, which is selected the most frequently by a user during the predetermined number of times of washings, is plural or not (1030).

As a result of the identification that the number of the most frequently selected washing mode is not plural, the controller 600 may allow the washing mode, which is selected the most frequently by a user, to be displayed on a first screen of the display window 52*a* (1040).

Referring to FIG. 10, in a case in which 'wool/lingerie' mode is selected four times, 'standard washing' mode is selected three times, 'towel' mode is selected once, and 'baby clothes' mode is selected two times during the washing machine 1 performs 10 times of washings, 'wool/lingerie' mode is identified as a washing mode that is the most frequently selected by a user.

Therefore, the controller 600 may allow 'wool/lingerie' mode, which is the most frequently selected for 10 times of washing that is predetermined, to be displayed on the first screen of the display window 52*a*. In response to the power-on of the washing machine 1, the controller 600 may allow 'wool/lingerie' mode to be displayed first on the first screen.

That is, in a general case, a washing mode is displayed on the display window 52*a* according to the washing mode list that is previously set and stored, as illustrated in FIG. 9. However, according to the washing machine and the control method thereof according to an embodiment, the controller 600 may identify a washing mode that is frequently selected by a user and then allow the corresponding washing mode to be displayed first on the display window 52*a*. Accordingly, it is possible to increase user convenience by preferentially displaying the washing mode that has a high usage frequency according to a user's washing machine usage pattern.

Meanwhile, a user may search for a washing mode list displayed on the display window 52*a* by rotating the inputter 51*a* implemented in a form of a jog dial clockwise or counterclockwise. On the display window 52*a*, 'wool/lingerie' mode with the highest usage frequency may be displayed on the first screen, and other washing modes may be displayed in a predetermined order as shown in FIG. 9 according to washing mode search of the user.

Referring to FIG. 8A again, as a result of the identification of the controller 600 that the most frequently selected washing mode is plural, the controller 600 may allow a washing mode, which is the last selected by a user among the plurality of washing modes, to be displayed on the first screen of the display window 52*a* (1050).

Referring to FIG. 10, in a case in which 'wool/lingerie' mode and 'bedding' mode are selected four times and 'towel' mode and 'baby clothes' mode are selected once during the washing machine 1 performs 10 times of washings, 'wool/lingerie' mode and 'bedding' mode are identified as a washing mode that is the most frequently selected by a user.

Therefore, the controller 600 may allow 'bedding' mode, which is the last selected by a user between 'wool/lingerie' mode and 'bedding' mode which are the most frequently selected by a user for 10 times of washing that is predetermined, to be displayed on the first screen of the display window 52*a*. The controller 600 may allow 'wool/lingerie' mode to be displayed after 'bedding' mode. In response to the power-on of the washing machine 1, the controller 600 may allow 'bedding' mode to be displayed first on the first screen.

According to the washing machine and the control method thereof according to an embodiment, the controller 600 may identify a washing mode that is frequently selected by a user and a washing mode that is the last selected by a user, and then allow the corresponding washing mode to be displayed first on the display window 52*a*. Accordingly, it is possible to increase user convenience by preferentially displaying the washing mode that has a high usage frequency and the washing mode that is the last used by a user according to a user's washing machine usage pattern.

Meanwhile, a user may search for a washing mode list displayed on the display window 52*a* by rotating the inputter 51*a* implemented in a form of a jog dial clockwise or counterclockwise. On the display window 52*a*, 'bedding' mode that has the highest usage frequency and that is the last selected by a user may be displayed on the first screen and 'wool/lingerie' mode may be displayed on a next screen, and other washing modes may be displayed in a predetermined order as shown in FIG. 9 according to the washing mode search of the user.

Referring to FIG. 8B, the inputter 51 may receive a selection of a washing mode from a user (1100), and the display 52 may display a washing option for the selected washing mode (1110).

As illustrated in FIG. 12, as for the washing machine 1, a washing option may be basically set for each washing mode and stored in the storage 800. In response to user's selection of washing mode, the washing machine 1 may perform washing on laundry with a washing option corresponding to the selected washing mode unless the user changes the washing option.

The inputter 51 may receive a washing option change command for the selected washing mode from a user (1120).

That is, the user may change the washing option while washing is performed according to the selected washing mode, and thus the washing may be performed according to the changed option and data regarding the washing option changed by the user may be stored in the storage 800.

Based on the number of times of receiving the washing option change command stored in the storage 800, the controller 600 may identify the number of times of changing the washing option for each the washing mode selected by the user.

The controller 600 may identify whether or not the washing option change command for the washing mode is received a predetermined number of times (1130), and as a result of the identification that the washing option is changed the predetermined number of times, the controller 600 may store the changed washing option command in the storage 800 (1140). In this case, the predetermined number of times that is used for the controller 600 to identify the number of the washing option change command may be three times, but this may vary according to the setting.

In response to the user's selection of the washing mode in which the washing option is changed the predetermined number of times, the controller 600 may allow the changed washing option to be displayed on the display 52 (1150), and the controller 600 may allow the washing machine 1 to perform the washing mode with the changed washing option (1160).

As mentioned above, in a case in which a washing option is set for each washing mode as illustrated in FIG. 12, when a user selects 'wool/lingerie' mode, the washing is performed in the corresponding washing option such as 'temperature 30° C.', 'rinse 3 times', and 'spin level 4'.

However, after selecting 'wool/lingerie' mode, the user may change 'spin level' from level 4 to level 2, and as a result of identification of the controller 600 that the number of times in which a user changes 'spin level' in 'wool/lingerie' mode from level 4 to level 2 is three times, the controller 600 may store the changed 'spin level' in the storage 800.

In addition, when the user selects 'wool/lingerie' mode during the washing, the changed washing option 'spin level 2' may be displayed on the display 52, and the washing machine 1 may perform washing in 'wool/lingerie' mode with 'spin level 2'

As mentioned above, according to the washing machine and the control method according to an embodiment, the controller 600 may identify a washing option, which is frequently changed and used by a user, allow the corresponding washing option to be displayed on the display 52 and perform the washing with the corresponding washing option, thereby increasing the user convenience.

Figure 14:
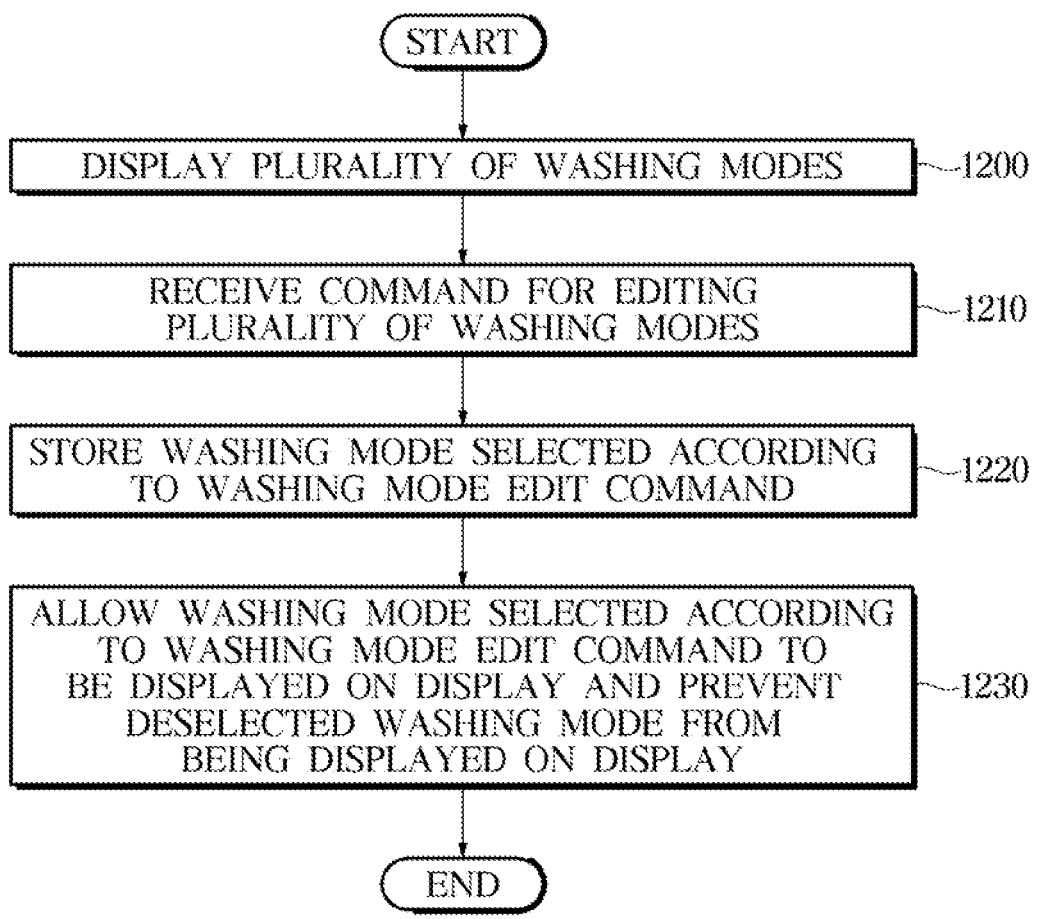
FIG. 14 is a flow chart illustrating a control method of washing mode setting of the washing machine according to an embodiment of the disclosure.
Figure 15:
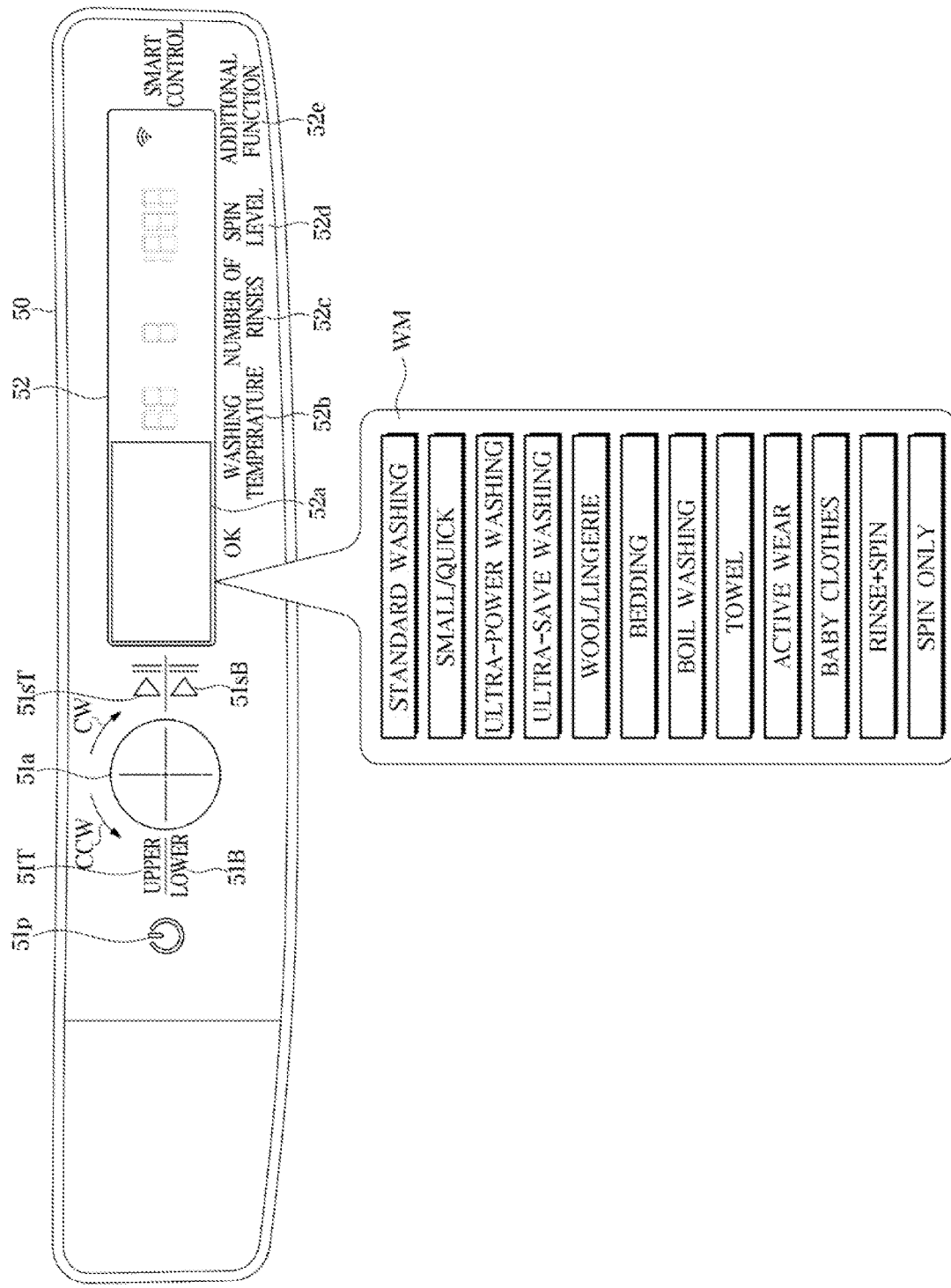
FIG. 15 illustrates that a washing mode of the washing machine is displayed according to an embodiment of the disclosure.
Figure 16:
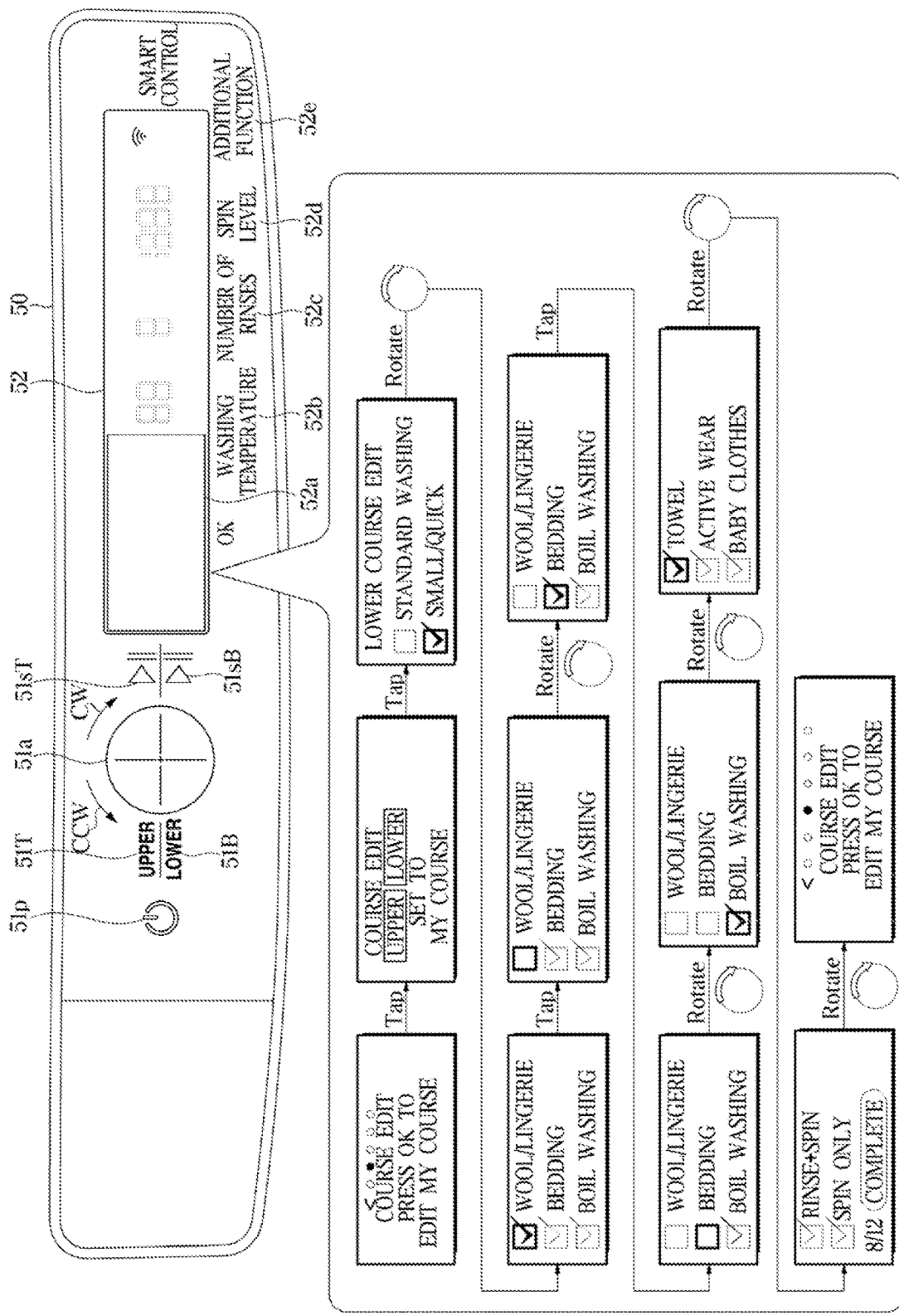
FIG. 16 illustrates editing of a washing mode of the washing machine according to an embodiment of the disclosure.
Figure 17:
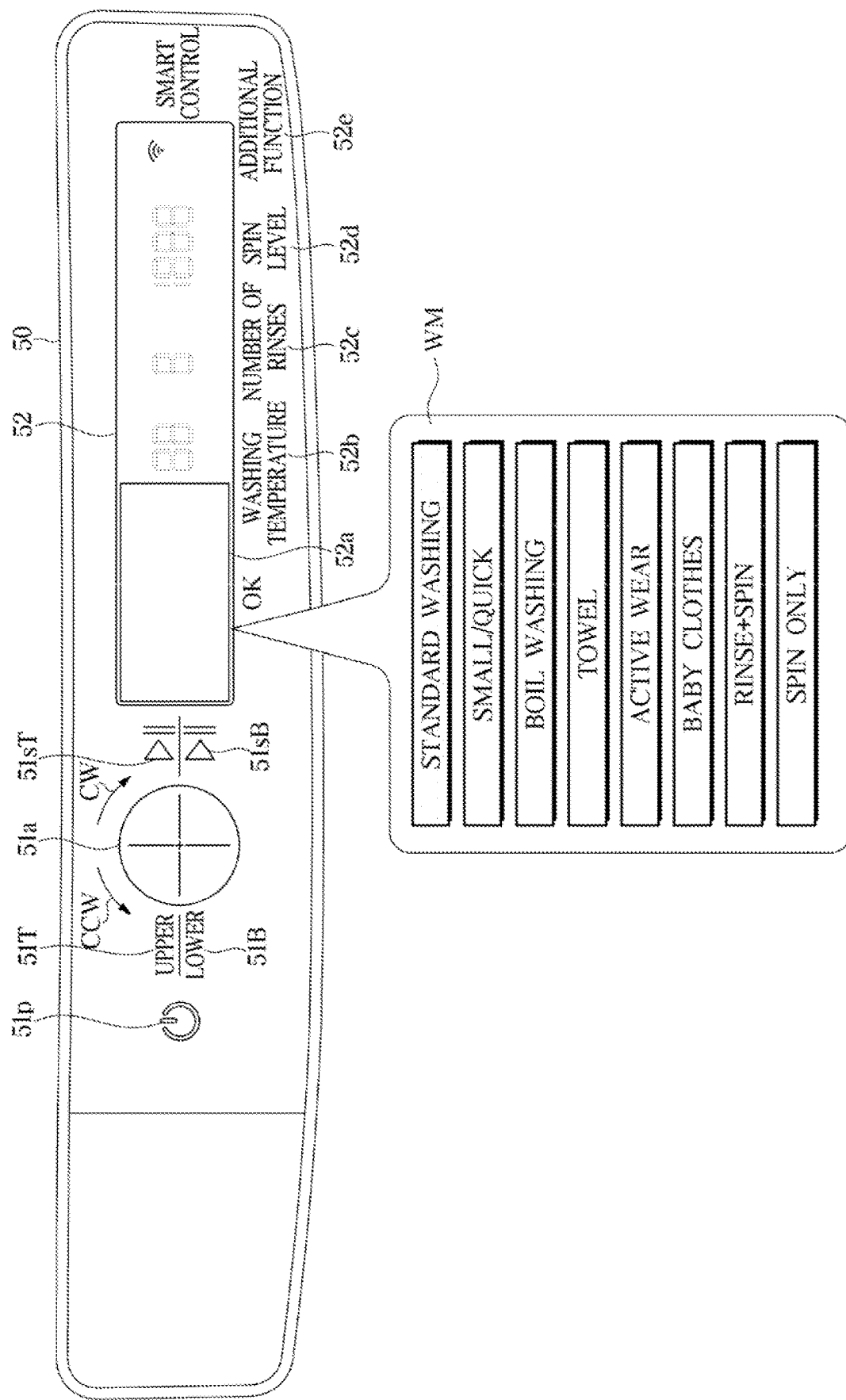
FIG. 17 illustrates that a washing mode, which is selected according to a washing mode edit command, is displayed according to an embodiment of the disclosure.

FIG. 14 is a flow chart illustrating a control method of washing mode setting of the washing machine according to an embodiment of the disclosure. FIG. 15 illustrates that a washing mode of the washing machine is displayed according to an embodiment of the disclosure. FIG. 16 illustrates editing of a washing mode of the washing machine according to an embodiment of the disclosure. FIG. 17 illustrates that a washing mode, which is selected according to a washing mode edit command, is displayed according to an embodiment of the disclosure.

Referring to FIG. 15, as described above in FIG. 9, the plurality of washing modes WM may be displayed on the display window 52a of the display 52 (1200). That is, in response to the power-on of the washing machine 1, a washing mode list, which is previously stored, may be displayed one by one on the display window 52a.

A user may search for a washing mode included in the washing mode list by rotating the inputter 51a, which is implemented in a form of a jog dial, clockwise CW or counterclockwise CCW.

There may be a washing mode, which is not used by a user, among the plurality of washing modes that is pre-stored in the washing machine 1 and then displayed. However, all of the pre-stored washing mode may be generally displayed on the display window 52a and it may cause a difficulty in which it takes unnecessary time to search for a washing mode desired by a user.

According to the washing machine and the control method according to an embodiment, a user can select only the washing mode to be used from among the plurality of preset washing modes, and only the washing mode selected by the user may be displayed on the display window 52a, and thus the user can conveniently search for a washing mode.

Referring to FIG. 14, a user may input a washing mode edit command through the inputter 51 (1210). That is, a user may enter a washing mode editing mode as shown in FIG. 16 through the inputter 51.

By rotating the jog dial-type inputter 51a clockwise or counterclockwise, a user may move to the next or previous step of the washing mode editing mode, and search for the plurality of washing modes.

Referring to FIG. 16, a user may select whether to edit the washing mode for the first washing apparatus 10 provided at the lower portion of the washing machine 1 and the second washing apparatus 20 provided at the upper portion of the washing machine 1. That is, the user can edit the washing mode of the first washing apparatus 10 by selecting the first washing apparatus 10, and can edit the washing mode of the second washing apparatus 20 by selecting the second washing apparatus 20.

By rotating the inputter 51a clockwise or counterclockwise, a user can search for the washing mode, and input a command to select a washing mode to be used or a command to deselect the washing mode.

That is, among 12 washing modes shown in FIG. 15, the user may select a washing mode to be used and deselect a washing mode not to be used. That is, as shown in FIG. 16, by clicking a selection button (not shown) for the washing mode displayed on the display window 52a, a user can input a check mark or remove the check mark so as to set a washing mode to be used.

Referring to FIG. 16, a user may input a washing mode deselect command for wool/lingerie' mode and 'bedding' mode by removing a check mark in wool/lingerie' mode and 'bedding' mode, thereby removing wool/lingerie' mode and 'bedding' mode from the washing mode to be used. On the other hand, a user may input the check mark in other washing mode or a user may not remove the previously input check mark from other washing mode, thereby adding the other washing mode into the washing mode to be used.

The storage 800 may store the washing mode selected according to the washing mode edit command of the above-described method (1220).

The controller 600 may allow the washing mode selected according to the washing mode edit command to be displayed on the display window 52a, and allow the washing mode, which is deselected, not to be displayed on the display window 52a (1230).

The display window 52a of the display 52 may display at least one washing mode selected according to the received washing mode select command. As shown in FIG. 17, 'standard washing' mode or 'spin only' mode, which is selected according to the washing mode select command, may be displayed in order of selection on the display window 52a, and the remaining washing modes, which is deselected, may not be displayed.

As described above, only the washing mode selected by a user is displayed on the display window 52a, and thus the user can conveniently search for the washing mode.

Figure 18A:
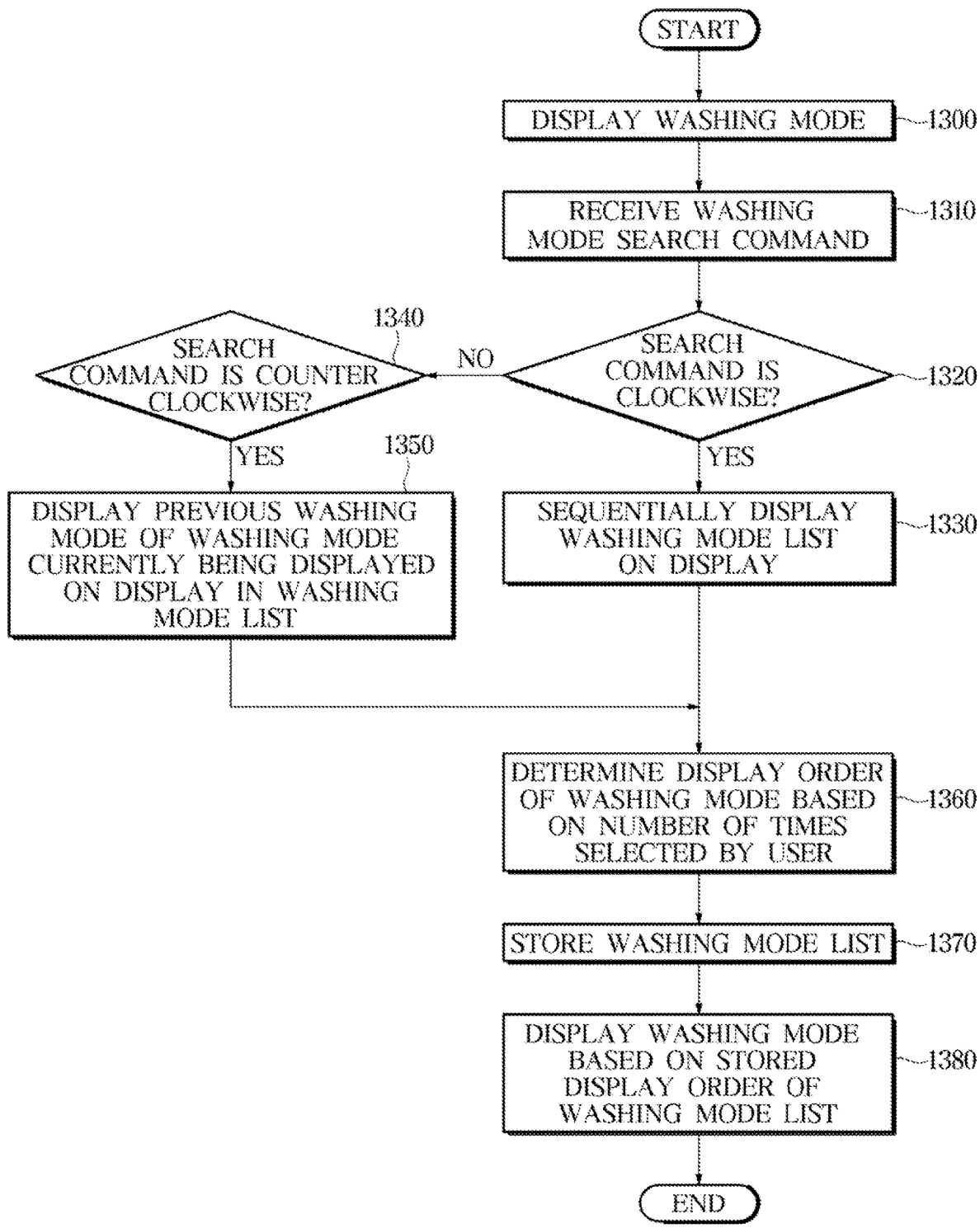
FIG. 18A is a flow chart illustrating a washing mode display control method according to another embodiment of the disclosure.
Figure 18B:
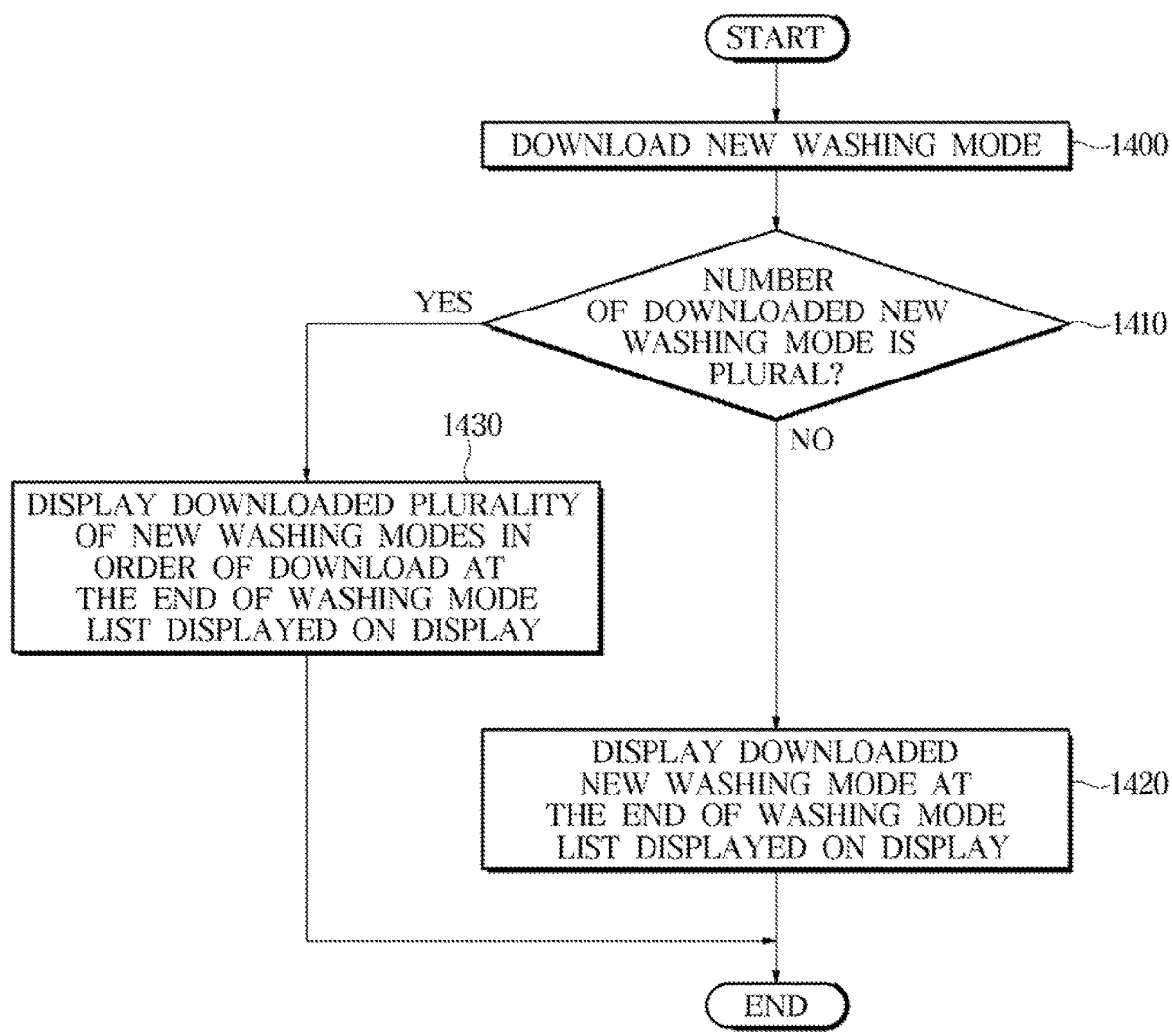
FIG. 18B is a flow chart illustrating the washing mode display control method according to another embodiment of the disclosure.
Figure 18C:
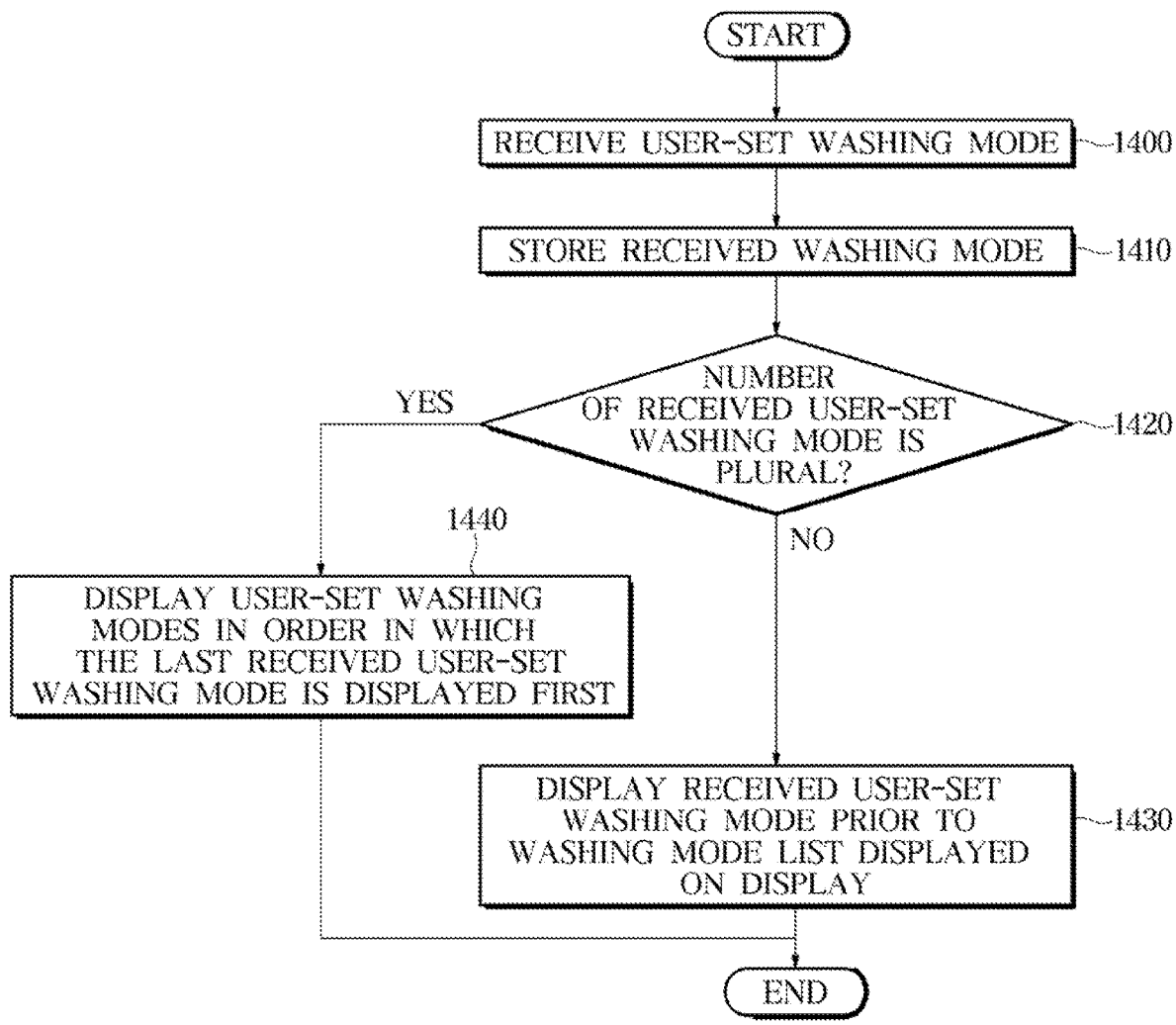
FIG. 18C is a flow chart illustrating the washing mode display control method according to another embodiment of the disclosure.
Figure 19:
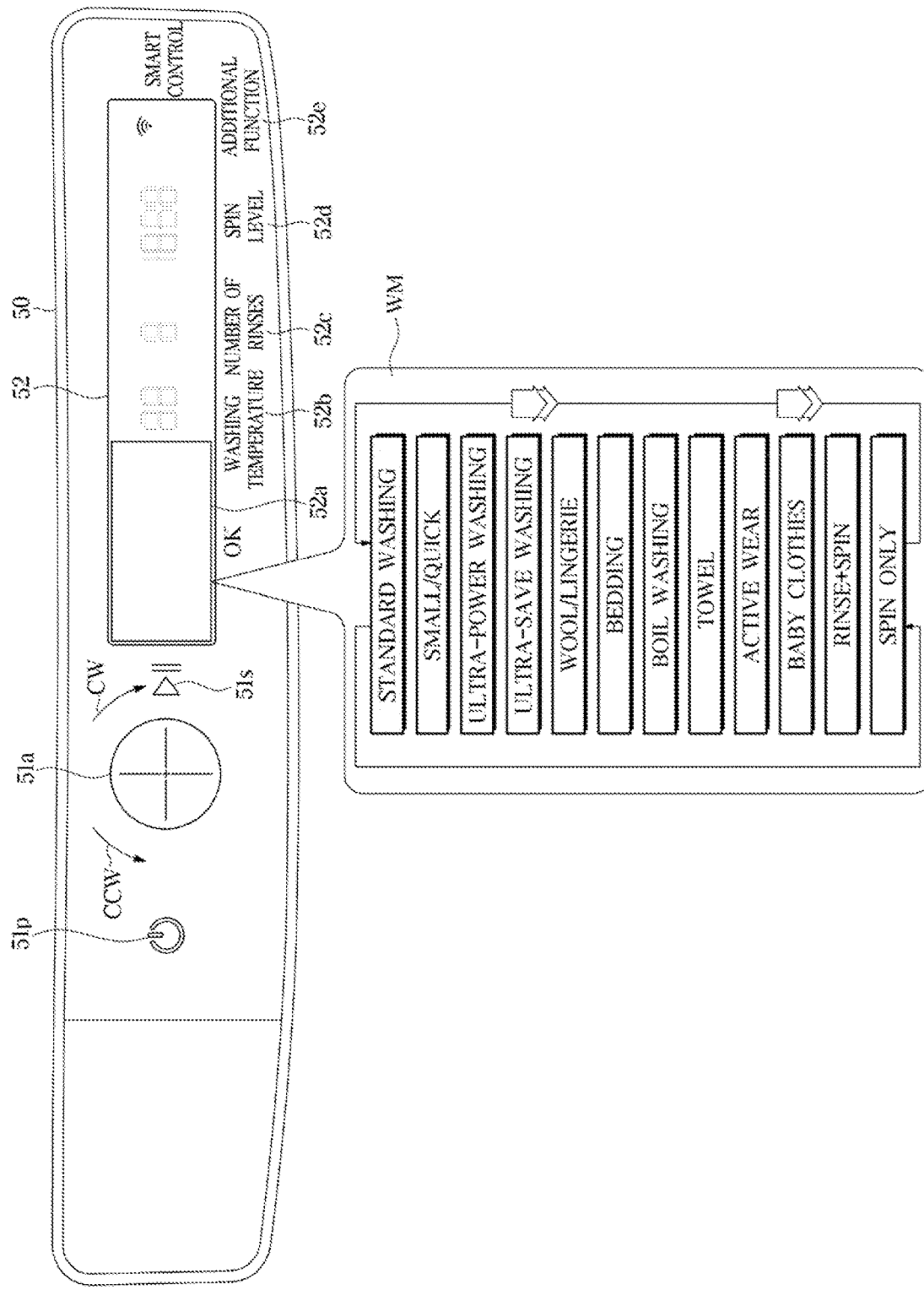
FIG. 19 illustrates a washing mode display and search method according to an embodiment of the disclosure.
Figure 20:
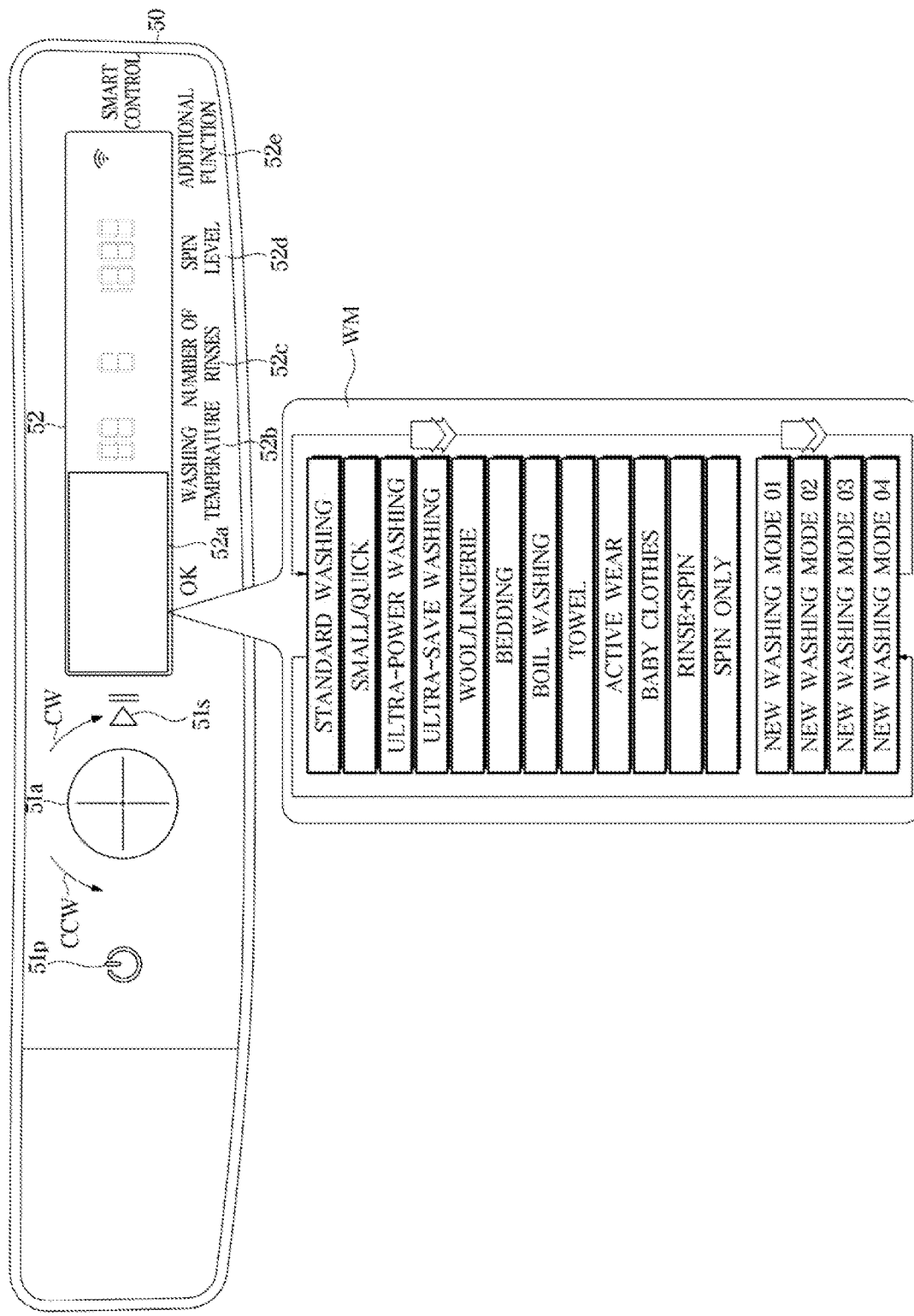
FIG. 20 illustrates a new washing mode, which is downloaded, display and search method according to an embodiment of the disclosure.
Figure 21:
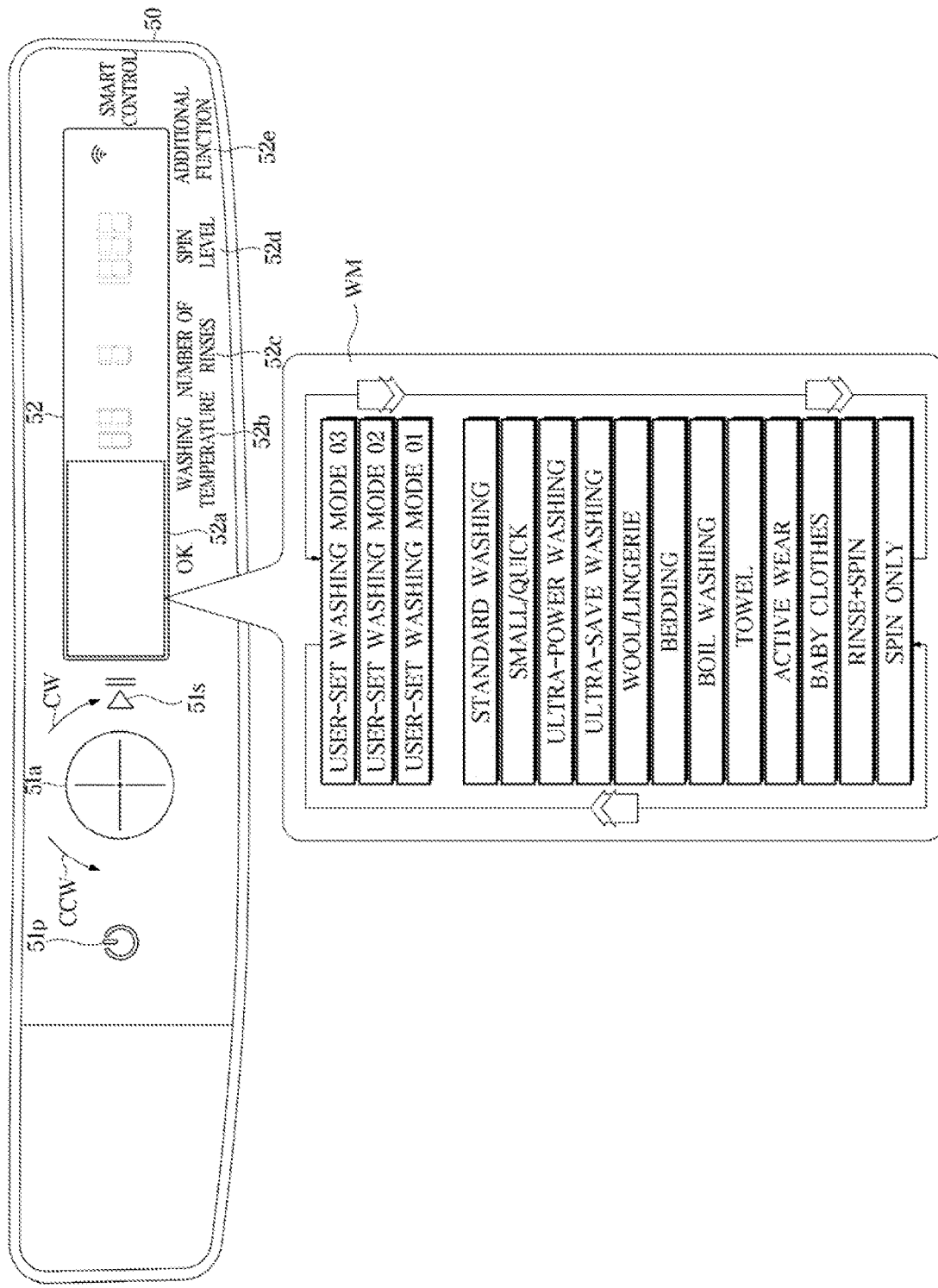
FIG. 21 illustrates a user-set washing mode display and search method according to an embodiment of the disclosure.

FIGS. 18A to 18C are flow charts illustrating a washing mode display control method according to another embodiment of the disclosure. FIG. 19 illustrates a washing mode display and search method according to an embodiment of the disclosure. FIG. 20 illustrates a new washing mode, which is downloaded, display and search method according to an embodiment of the disclosure. FIG. 21 illustrates a user-set washing mode display and search method according to an embodiment of the disclosure.

Referring to FIG. 19, the washing mode WM of the washing machine 1 may be displayed on the display window 52a of the display 52 (1300). That is, in response to the power-on of the washing machine 1, a washing mode list, which is previously stored, may be displayed one by one on the display window 52a.

A user may input a command for searching for a washing mode included in the washing mode list by rotating the inputter 51a, which is implemented in a form of a jog dial, clockwise CW or counterclockwise CCW (1310).

The controller 600 may identify an input direction of the washing mode search command input from a user through the inputter 51a.

As a result of the identification that the input direction is clockwise CW (1320), the controller 600 may allow the pre-stored washing mode list to be displayed on the display window 52a in a predetermined order (1330). That is, when a user rotates the inputter 51a clockwise, the washing mode may be sequentially changed and displayed on the display window 52a.

On the other hand, as a result of the identification that the input direction is counterclockwise CCW (1340), the controller 600 may allow a previous washing mode of a washing mode, which is currently being displayed on the display window 52a in the washing mode list, to be displayed (1350).

Referring to FIG. 19, for example, in a state in which the washing mode currently displayed on the display window 52a is 'bedding', when a user inputs a search command in the clockwise direction CW through the inputter 51a, 'boil washing' mode next to 'bedding' mode may be displayed on the display window 52a. On the other hand, when a user inputs a search command in the counterclockwise direction CCW through the inputter 51a, 'wool/lingerie' mode, which is the previous washing mode of 'bedding' mode, may be displayed on the display window 52a.

Meanwhile, the controller (600) may preferentially determine a display order of the washing mode list displayed on the display window 52a among the plurality of washing mode lists in proportion to the number of times of the washing mode selected by a user (1360).

The controller 600 may store the number of times of the washing mode selected by the user among the washing mode list and data regarding the selected washing mode in the storage 800 (1370), and the controller 600 may allow a washing mode that is frequently selected by a user to be displayed first on the display window 52a. That is, the controller 600 may display the washing mode on the display window 52a according to the display order of the washing mode list determined based on the number of times selected by the user (1380).

In response to the power on of the washing machine, the controller 600 may allow the washing mode to be displayed based on the previously determined display order of the washing mode list, and in response to the number of the washing modes having the same number of selection times being plural, the controller 600 may allow a washing mode, which is the last selected, to be preferentially displayed among the plurality of washing modes.

As the frequency selected by the user for the plurality of washing modes is changed, the order of washing modes preferentially displayed on the display window 52a may be changed.

Referring to FIG. 18B, the communication circuitry 700 may download a new washing mode list from a server connected to a network (1400). That is, in addition to the washing modes previously stored in the washing machine 1, the communication circuitry 700 may download the new washing mode list.

The controller 600 may identify whether a new washing mode downloaded by the communication circuitry 700 is plural or not (1410), and as a result of identification that the new washing mode is not plural, the controller 600 may allow the downloaded new washing mode to be displayed at the end of the washing mode list displayed on the display window 52a (1420).

In addition, as a result of identification that the downloaded new washing mode is plural, the controller 600 may allow the plurality of new washing modes to be displayed at the end of the list of washing modes displayed in order of download on the display window 52a (1430).

As illustrated in FIG. 20, when the communication circuitry 700 downloads new washing mode 01 to new washing mode 04 in order, the new washing mode 01 to the new washing mode 04 may be displayed at the end of the washing mode list, which is previously displayed on the display window 52a, in the order of download.

In response to inputting a search command in the clockwise CW direction by a user through the inputter 51a, the new washing mode 01 to the new washing mode 04 may be displayed in order on the display window 52a, and in response to inputting a search command in the counterclockwise CCW direction by a user through the inputter 51a, the new washing mode 01 to the new washing mode 04 may be displayed in reverse order of the download on the display window 52a that is the last downloaded new washing mode is displayed first.

That is, the washing machine 1 may download a new washing mode from the server according to the changing weather or washing trend, and the washing machine 1 may have the effect of expanding the washing method in various ways.

Referring to FIG. 18C, a user may input a user-set washing mode through the inputter 51 (1400), and the storage 800 may store the received user-set washing mode (1410).

That is, in addition to the washing mode and washing option preset in the washing machine 1, a user may input a user-set washing mode for directly setting the washing mode and washing option.

The controller 600 may identify whether a user-set washing mode input from a user is plural or not (1420), and as a result of identification that the user-set washing mode is not plural, the controller 600 may allow the user set washing mode to be displayed prior to the washing mode list displayed on the display window 52a (1430). In this case, in response to the power-on of the washing machine 1, the display window 52a may display a user-set washing mode input from the user.

In addition, as a result of the identification of the controller 600 that the user-set washing mode is plural, the controller 600 may allow the received user-set washing mode to be sequentially displayed from a user-set washing mode that is the last received (1440). In this case, in response to the power-on of the washing machine 1, the display window 52a may display a user-set washing mode, which is the last input from a user, among the plurality of use-set washing modes input from the user.

As illustrated in FIG. 21, when user-set washing mode 01 to user-set washing mode 03 are input in order, the user-set washing mode 01 to the user-set washing mode 03 may be displayed from the user-set washing mode 03, which is the last input, prior to the washing mode list, which is previously displayed on the display window 52a.

In response to inputting the search command in the clockwise CW direction by a user through the inputter 51a, the plurality of user-set washing modes may be displayed on the display window 52a in reverse order of input, which is the last input user-set washing mode is displayed first. In response to inputting the search command in the counter-clockwise CCW direction by a user through the inputter 51a, the plurality of user-set washing modes may be displayed on the display window 52a in order of input, which is the first input user-set washing mode is displayed first.

That is, the user can directly set a preferred washing mode and store the preferred washing mode in the washing machine 1, thereby variously expanding the washing method.

Figure 22:
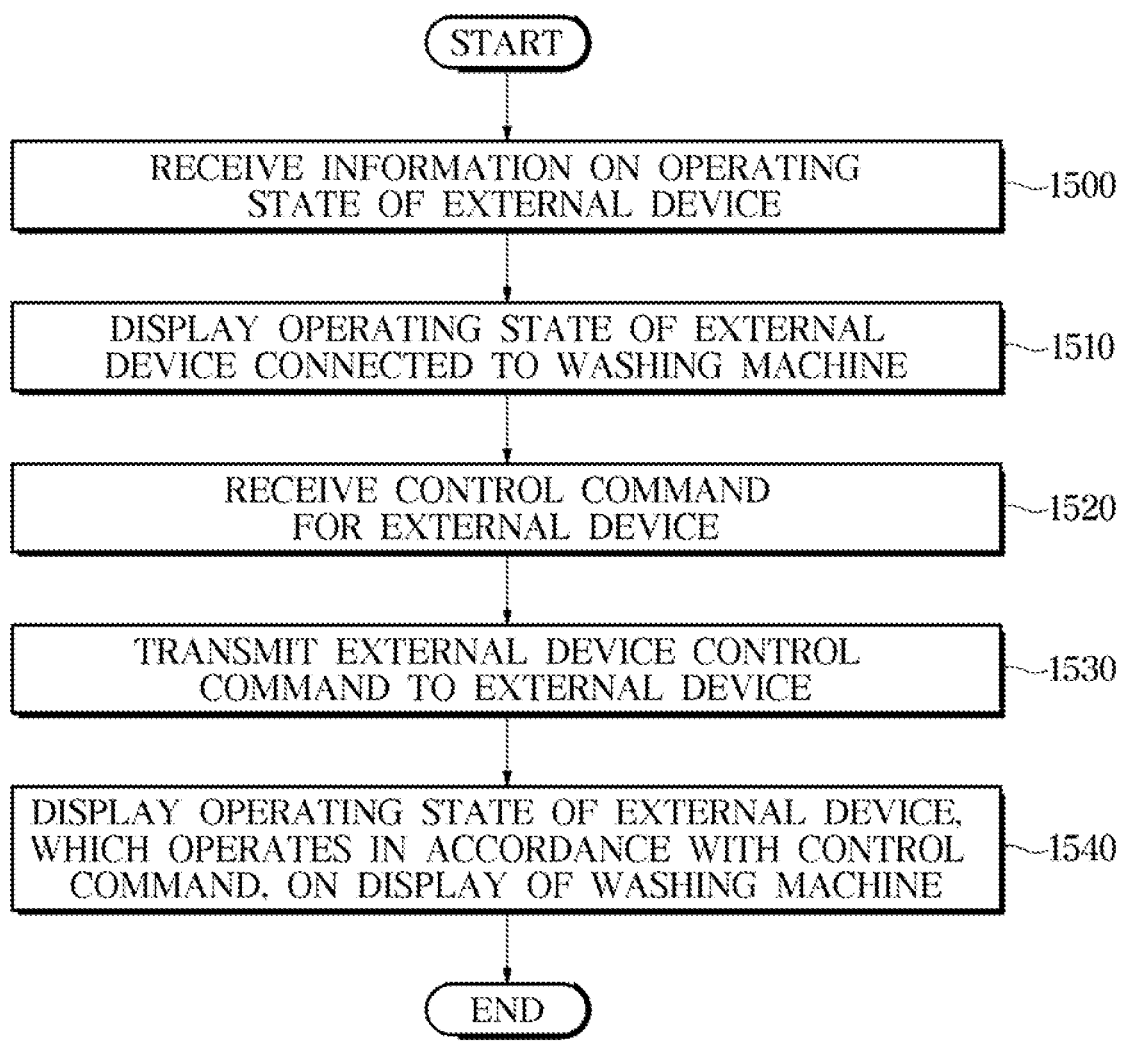
FIG. 22 is a flow chart illustrating a method for controlling an external device through the washing machine according to an embodiment of the disclosure.
Figure 23:
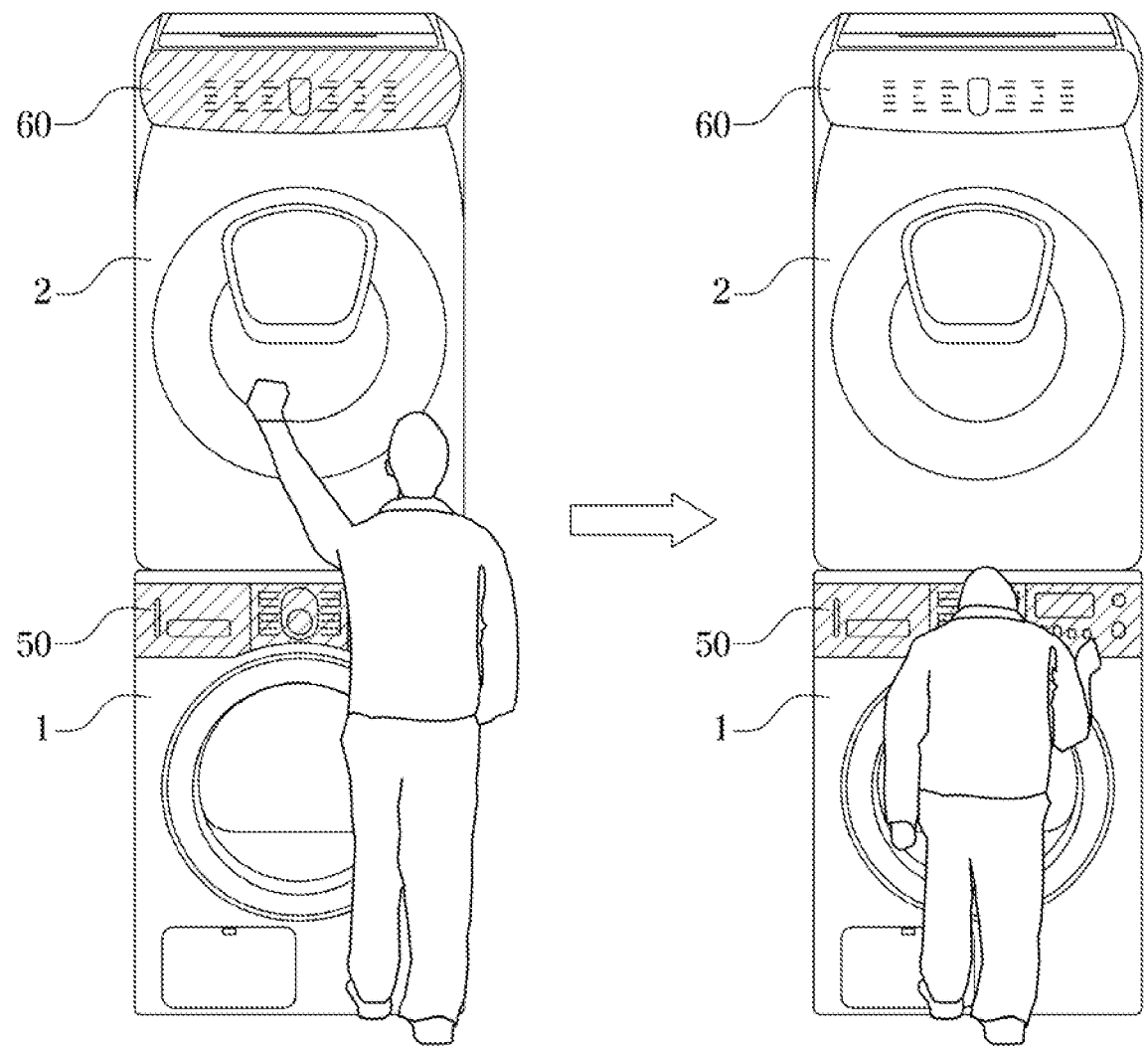
FIG. 23 is a schematic diagram illustrating a case of controlling an external device connected to the washing machine according to an embodiment of the disclosure.
Figure 24:
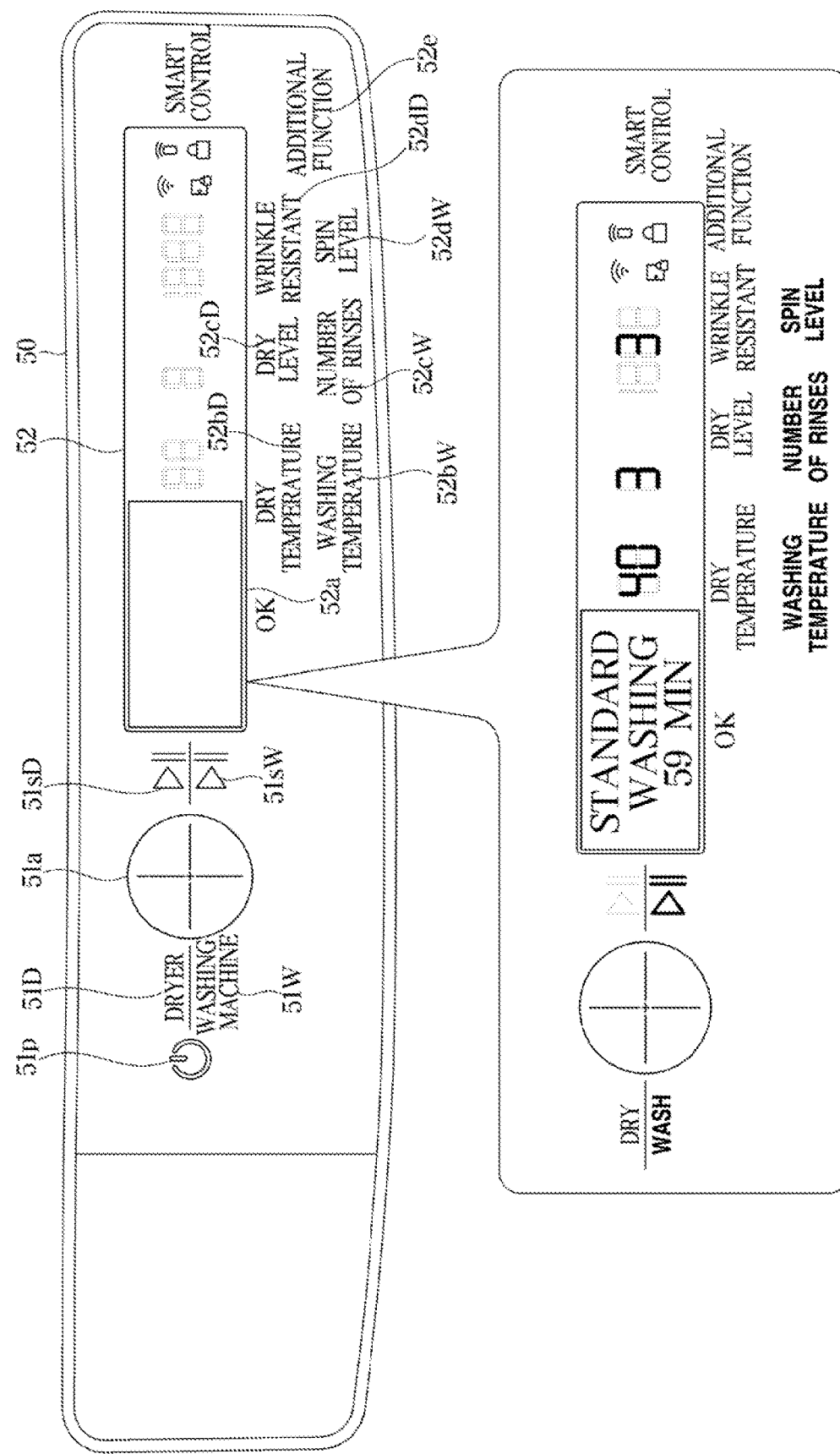
FIG. 24 illustrates that an operating state related to the washing machine and an external device is displayed according to an embodiment of the disclosure.
Figure 25:
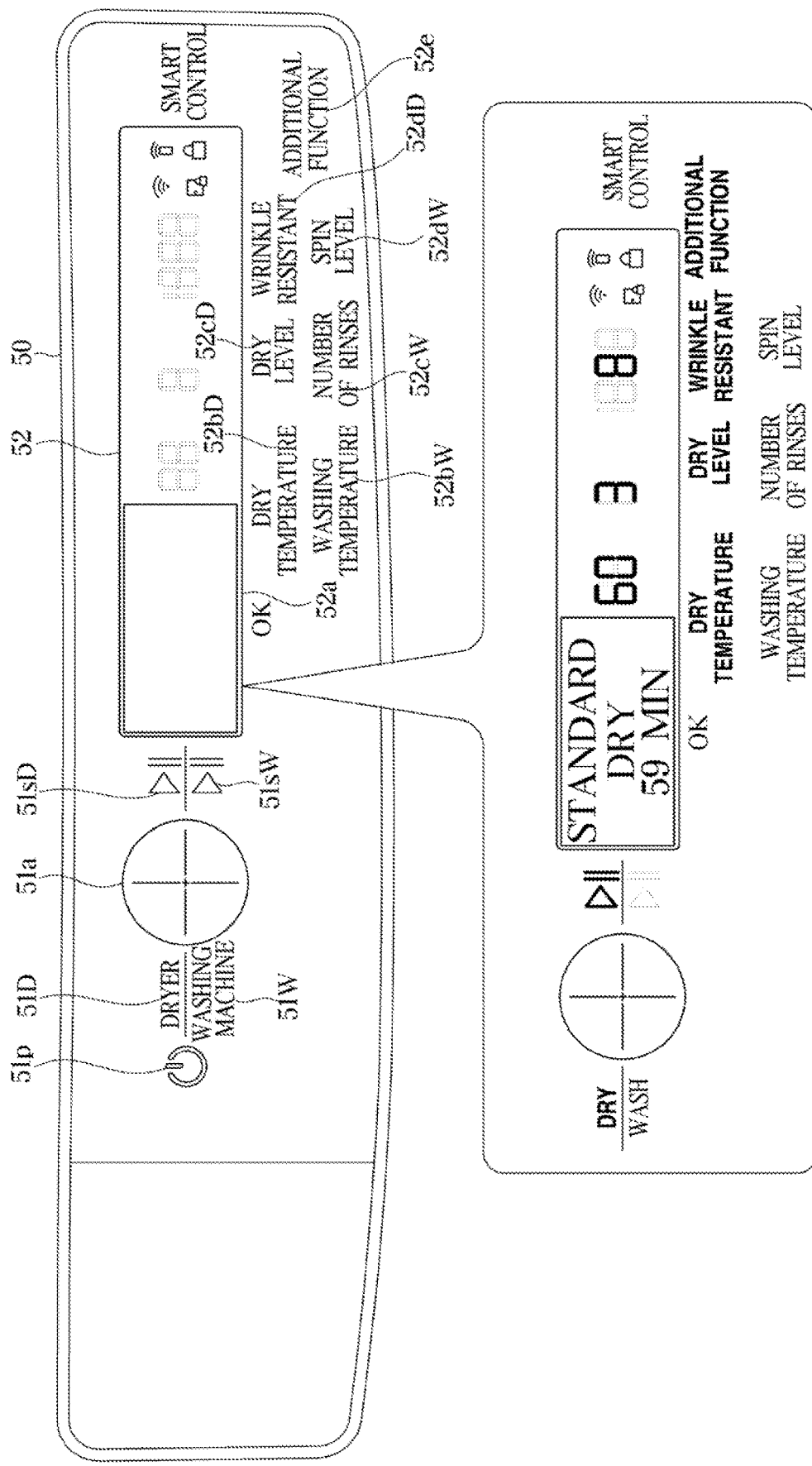
FIG. 25 illustrates that an operating state related to the washing machine and the external device is displayed according to an embodiment of the disclosure.
Figure 26:
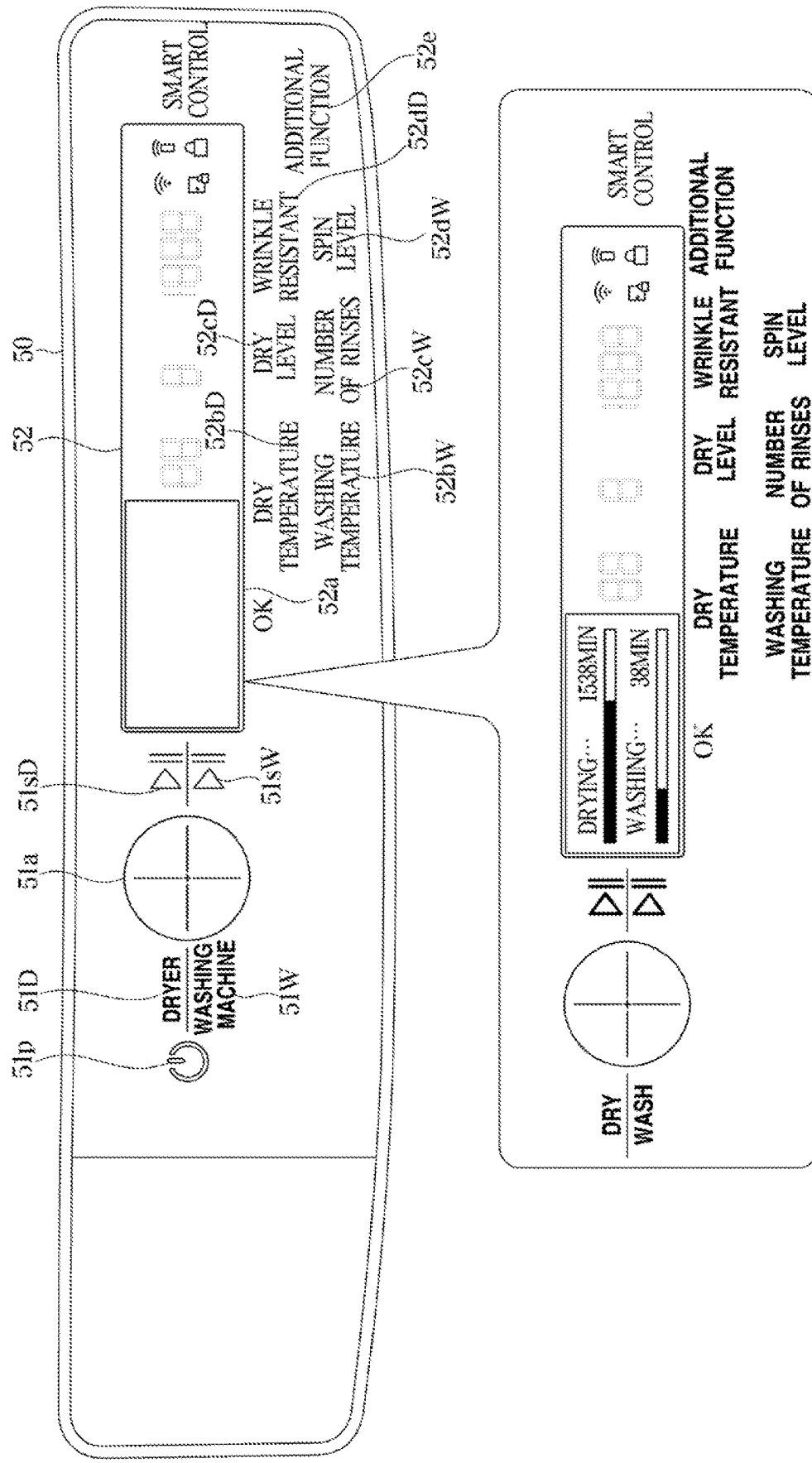
FIG. 26 illustrates that an operating state related to the washing machine and the external device is displayed according to an embodiment of the disclosure.

FIG. 22 is a flow chart illustrating a method for controlling an external device through the washing machine according to an embodiment of the disclosure. FIG. 23 is a schematic diagram illustrating a case of controlling an external device connected to the washing machine according to an embodiment of the disclosure. FIGS. 24 to 26 illustrate that an operating state related to the washing machine and an external device is displayed according to an embodiment of the disclosure.

As illustrated in FIG. 23, a user can use the washing machine 1 and a dryer 2 arranged up and down. In this case, the user needs to manipulate a control panel 60 of the dryer 2 so as to control the dryer 2 but it is difficult for the user to manipulate the dryer 2 due to a height of the dryer 2.

However, the washing machine 1 and the dryer 2 may be connected in a wired or wirelessly manner, and according to the washing machine 1 and the control method thereof according to an embodiment of the disclosure, a user can control an operation of the dryer 2 by manipulating the control panel 50 installed in the washing machine 1.

The communication circuitry 700 of the washing machine 1 may be implemented with a wired communication circuitry or a wireless communication circuitry. In response to the connection between the washing machine 1 and the dryer 2 in a wired or wireless manner, a message regarding a state of receiving a control command for the dryer 2 may be displayed on the display window 52a of the washing machine 1.

Referring to FIG. 22, the communication circuitry 700 may receive information on the operating state of an external device, that is, the dryer 2 (1500), and the display 52 of the washing machine 1 may display the operating state of the dryer 2 (1510).

A user may input a control command for the dryer 2 through the inputter 51 provided on the control panel 50 of the washing machine 1 (1520). The communication circuitry 700 of the washing machine 1 may transmit the dryer control command input from the user to the dryer 2 (1530), and the dryer 2 may operate according to the control command received from the washing machine 1.

The washing machine 1 may receive operating state information of the dryer 2 operating according to the control command input from the user, and the received operating state information of the dryer 2 may displayed on the display 52 of the washing machine 1 (1540).

A user may input a control command for the washing machine 1 or the dryer 2 by selecting at least one of the washing machine selection icon 51W or the external device selection icon 51D that are displayed on the control panel 50 of the washing machine 1.

Referring to FIG. 24, a control command for the washing machine 1 may be received through the control panel 50 of the washing machine 1, and an operating state of the washing machine 1 operating in response to the received control command may be displayed.

Referring to FIG. 25, a user may select a dryer control mode through the external device selection icon 51D, and in response to receiving the control command for the dryer 2 through the control panel 50 of the washing machine 1, an operating state of the dryer 2 operating in response to the received control command may be displayed.

Further, a user can simultaneously input the washing machine control command and the dryer control command through the control panel 50 of the washing machine 1, and as illustrated in FIG. 26, the display 52 of the washing machine 1 may simultaneously display an operating state of the washing machine 1 and an operating state of the dryer 2 operating in response to the received control command.

As mentioned above, even when the washing machine 1 and the dryer 2 are arranged vertically and it is difficult to manipulate the control panel 60 of the dryer 2, a user can operate the dryer 2 by manipulating the control panel 50 of the washing machine 1 and a user can check and modify the operating state of the washing machine 1 and the dryer 2 through the control panel 50 of the washing machine 1.

As is apparent from the above description, the washing machine 1 and the control method thereof according to an embodiment may allow a user to variously control the washing mode through the manipulation of the control panel 50 of the washing machine 1, and the washing machine 1 may automatically provide information on the washing mode frequently used by a user to the user, thereby increasing the user convenience. Further, it is possible to control an operation of devices connected to the washing machine through the washing machine, thereby conveniently manipulating devices related to the washing machine.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus comprising:
a washing machine having an opening through which to receive laundry into the washing machine;
a dryer disposed above the washing machine, having an opening through which to receive laundry into the dryer, and being capable of communicating with the washing machine;
a communicator configured to communicate with an external server to download a washing mode from the external server; and
a control panel disposed between the opening of the washing machine and the opening of the dryer, and including:
a display to display an operation state of the washing machine and an operation state of the dryer,
a washing machine selection inputter that is operable by a user to select the washing machine,
a washing machine operation start/stop inputter which is displayable in a first state that indicates to the user that the washing machine operation start/stop inputter is not operable by the user, and a second state that indicates to the user that the washing machine operation start/stop inputter is operable by the user to start or stop an operation of the washing machine,
a dryer selection inputter that is operable by the user to select the dryer,
a dryer operation start/stop inputter which is displayable in a first state that indicates to the user that the dryer operation start/stop inputter is not operable by the user, and a second state that indicates to the user that the dryer operation start/stop inputter is operable by the user to start or stop an operation of the dryer,
a plurality of washing option inputters operable by the user to select washing options for a selected washing mode of a plurality of preset washing modes, and
a plurality of indicators to indicate the washing options selected via the plurality of washing option inputters,
wherein the washing machine selection inputter, the washing machine operation start/stop inputter, the dryer selection inputter, and the dryer operation start/stop inputter are spaced apart from each other, and spaced apart from the display; and
at least one processor configured to:
in response to the washing machine selection inputter being operated by the user to select the washing machine while the washing machine operation start/stop inputter is displayed in in the first state, control the washing machine operation start/stop inputter to be displayed in the second state,
in response to the dryer selection inputter being operated by the user to select the dryer while the dryer start/stop inputter is displayed in in the first state, control the dryer operation start/stop inputter to be displayed in the second state, and
in response to the selected washing mode being a washing mode that had previously been performed by the washing machine, control the plurality of indicators to indicate at least one washing option based on the at least one washing option having been modified from default options by equal or more than a predetermined number of times for the washing mode.

2. An apparatus as in claim 1, wherein the at least one processor is configured to:
in response to the washing machine selection inputter being operated by the user to select the washing machine, control the display to display the operation state of the washing machine, and
in response to the dryer selection inputter being operated by the user to select the dryer, control the display to display the operation state of the dryer.

3. An apparatus as in claim 2, wherein the at least one processor is configured to:
while the washing machine and the dryer are simultaneously operating, control the display to simultaneously display the operation state of the washing machine and the operation state of the dryer.

4. An apparatus as in claim 2, wherein the at least one processor is configured to:
control the washing machine operation start/stop inputter and the dryer operation start/stop inputter so that, while the washing machine and the dryer are simultaneously operating, the washing machine operation start/stop inputter is displayed in the second state and the dryer operation start/stop inputter is displayed in the second state.

5. The apparatus as in claim 1, wherein
the control panel further includes:
a temperature selecting inputter that is operable by the user to select a washing temperature for the selected washing mode, and displayable in a first state that indicates to the user that the temperature selecting inputter is not operable by the user, and a second state that indicates to the user that the temperature selecting inputter is operable by the user to select a temperature for the selected washing mode, and
the at least one processor is configured to:
in response to the washing machine selection inputter being operated by the user to select the washing machine while the temperature selecting inputter is displayed in the first state, control the temperature selecting inputter to be displayed in the second state.

6. The apparatus as in claim 5, wherein
the control panel further includes:
a spin-dry setting inputter that is operable by the user to select a spin level for the selected washing mode, and displayable in a first state that indicates to the user that the spin-dry setting inputter is not operable by the user, and a second state that indicates to the user that the spin-dry setting inputter is operable by the user to select a spin level for the selected washing mode, and
the at least one processor is configured to:
in response to the washing machine selection inputter being operated by the user to select the washing machine while the spin-dry setting inputter is displayed in the first state, control the spin-dry setting inputter to be displayed in the second state.

7. The apparatus as in claim 1, wherein
the plurality of washing option inputters include a temperature selecting inputter that is operable by the user to select a washing temperature for the selected washing mode, and displayable in a first state that indicates to the user that the temperature selecting inputter is not operable by the user, and a second state that indicates to the user that the temperature selecting inputter is operable by the user to select a washing temperature for the selected washing mode.

8. The apparatus as in claim 7, wherein the at least one washing option includes a washing temperature that had previously been selected via the temperature selecting inputter.

9. The apparatus as in claim 7, wherein the at least one processor is configured to:
   in response to the washing machine selection inputter being operated by the user to select the washing machine while the temperature selecting inputter is displayed in the first state, control the temperature selecting inputter to be displayed in the second state.

10. The apparatus as in claim 1, wherein
    the plurality of washing option inputters include a spin-dry setting inputter that is operable by the user to select a spin level for the selected washing mode, and displayable in a first state that indicates to the user that the spin-dry setting inputter is not operable by the user, and a second state that indicates to the user that the spin-dry setting inputter is operable by the user to select a spin level for the selected washing mode.

11. The apparatus as in claim 10, wherein the at least one washing option includes a spin level that had previously been selected via the spin-dry setting inputter.

12. The apparatus as in claim 10, wherein the at least one processor is configured to:
    in response to the washing machine selection inputter being operated by the user to select the washing machine while the spin-dry setting inputter is displayed in the first state, control the spin-dry setting inputter to be displayed in the second state.

13. An apparatus as in claim 1, wherein the at least one processor is configured to:
    in response to the washing machine selection inputter being operated by the user to select the washing machine, control the display to display the operation state of the washing machine, and
    in response to the dryer selection inputter being operated by the user to select the dryer, control the display to display the operation state of the dryer.

14. An apparatus as in claim 13, wherein the at least one processor is configured to:
    while the washing machine and the dryer are simultaneously operating, control the display to simultaneously display the operation state of the washing machine and the operation state of the dryer.

15. An apparatus as in claim 13, wherein the at least one processor is configured to:
    control the washing machine operation start/stop inputter and the dryer operation start/stop inputter so that, while the washing machine and the dryer are simultaneously operating, the washing machine operation start/stop inputter is displayed in the second state and the dryer operation start/stop inputter is displayed in the second state.

16. An apparatus as in claim 1, wherein the at least one processor is configured to:
    in response to the communicator communicating with the external server to download the washing mode from the external server, add the downloaded washing mode as an additional washing mode to a plurality of preset washing modes of the washing machine, without modifying a washing mode of the plurality of preset washing modes to incorporate features of the downloaded washing mode.

* * * * *

UNITED STATES PATENT AND TRADEMARK OFFICE
CERTIFICATE OF CORRECTION

PATENT NO. : 11,560,661 B2
APPLICATION NO. : 17/314273
DATED : January 24, 2023
INVENTOR(S) : Bobin Kim et al.

It is certified that error appears in the above-identified patent and that said Letters Patent is hereby corrected as shown below:

In the Claims

Column 25, Line 60:
In Claim 1, delete "in in" and insert --in--.

Column 25, Line 65:
In Claim 1, delete "in in" and insert --in--.

Signed and Sealed this
Fourteenth Day of March, 2023

Katherine Kelly Vidal
*Director of the United States Patent and Trademark Office*